(12) United States Patent
Wei

(10) Patent No.: US 11,775,274 B2
(45) Date of Patent: Oct. 3, 2023

(54) APPLICATION SOFTWARE INSTALLATION METHOD, DEVICE, AND SERVER

(71) Applicant: Huawei Technologies Co., Ltd., Shenzhen (CN)

(72) Inventor: Wenbo Wei, Wuhan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/059,742

(22) PCT Filed: May 27, 2019

(86) PCT No.: PCT/CN2019/088467
§ 371 (c)(1),
(2) Date: Nov. 30, 2020

(87) PCT Pub. No.: WO2019/228287
PCT Pub. Date: Dec. 5, 2019

(65) Prior Publication Data
US 2021/0216297 A1    Jul. 15, 2021

(30) Foreign Application Priority Data

May 29, 2018  (CN) .......................... 201810534151.3
Jun. 26, 2018  (CN) .......................... 201810673131.4

(51) Int. Cl.
*G06F 9/44*      (2018.01)
*G06F 9/455*     (2018.01)
(Continued)

(52) U.S. Cl.
CPC ...................................... *G06F 8/61* (2013.01)

(58) Field of Classification Search
CPC ..... G06F 8/60; G06F 8/61; G06F 8/62; G06F 3/048
See application file for complete search history.

(56) References Cited

U.S. PATENT DOCUMENTS 8,552,975 B2 * 10/2013 Jung .................. H04N 21/4431
                                                         345/173
9,098,370 B2 *  8/2015 MacDonald .............. G06F 8/62
(Continued)

FOREIGN PATENT DOCUMENTS

CN    102646041 A    8/2012
CN    102999398 A    3/2013
(Continued)

OTHER PUBLICATIONS

P. Berthomé, Repackaging Android Applications for Auditing Access to Private Data, 2012, pp. 388-396. https://ieeexplore.ieee.org/stamp/stamp.jsp?tp=&arnumber=6329209 (Year: 2012).*
(Continued)

*Primary Examiner* — Mongbao Nguyen
(74) *Attorney, Agent, or Firm* — Conley Rose, P.C.

(57) ABSTRACT

An application software installation method includes: accessing, by a device, a server; receiving, by the device, an editing operation of a user for a to-be-installed application set in the server, where the to-be-installed application set includes N application software identifiers, where N is a positive integer, the N application software identifiers are used to indicate corresponding to-be-installed application software, and the to-be-installed application software is application software backed up by another device in the server; and sending, by the device, an editing instruction for the to-be-installed application set to the server based on the editing operation, where the editing instruction is used to instruct the server to add an application software identifier to the to-be-installed application set and/or delete an application software identifier from the to-be-installed application set, so that the server obtains an updated to-be-installed application set.

20 Claims, 19 Drawing Sheets

(51) Int. Cl.
    *G06F 9/445*                (2018.01)
    *G06F 8/61*                  (2018.01)

(56) References Cited

U.S. PATENT DOCUMENTS

| | | |
|---|---|---|
| 9,185,513 B1 | 11/2015 | Hsieh |
| 10,455,039 B2* | 10/2019 | Jiang ................... H04L 45/742 |
| 10,466,991 B1* | 11/2019 | Hussain .................. G06F 8/62 |
| 11,036,344 B1* | 6/2021 | Portelli .................. G06F 3/0481 |
| 2007/0100963 A1 | 5/2007 | Ban et al. |
| 2012/0096455 A1* | 4/2012 | Katsumata .......... G06F 9/45558 717/177 |
| 2012/0185841 A1* | 7/2012 | Lee ......................... G06F 8/65 717/171 |
| 2012/0246630 A1* | 9/2012 | Kuzins .................... G06F 8/61 717/169 |
| 2013/0326499 A1* | 12/2013 | Mowatt .................. G06F 8/60 717/177 |
| 2014/0208312 A1 | 7/2014 | Liao et al. |
| 2014/0351215 A1* | 11/2014 | Xu .......................... G06F 8/61 707/634 |
| 2015/0033219 A1* | 1/2015 | Breiner .................. G06F 8/61 717/178 |
| 2015/0120802 A1* | 4/2015 | Wang ...................... G06F 9/54 709/201 |
| 2016/0132214 A1* | 5/2016 | Koushik ................ G06F 9/455 715/741 |
| 2016/0132310 A1* | 5/2016 | Koushik ................ G06F 8/61 717/176 |
| 2016/0321066 A1* | 11/2016 | Wang ..................... G06F 8/658 |
| 2017/0003951 A1 | 1/2017 | Newell et al. |
| 2017/0017480 A1 | 1/2017 | Zhang |
| 2017/0102930 A1* | 4/2017 | Sawaya ................... G06F 8/62 |
| 2017/0161048 A1* | 6/2017 | Araki ...................... G06F 8/62 |
| 2017/0255456 A1* | 9/2017 | Igarashi ................. G06F 8/61 |
| 2017/0329939 A1* | 11/2017 | Yuki .................... G06F 21/105 |
| 2018/0024804 A1* | 1/2018 | Duan ................... G06F 40/134 715/740 |
| 2019/0012159 A1* | 1/2019 | Cabrera .................. G06F 8/62 |
| 2019/0265958 A1* | 8/2019 | Ayers ..................... G06F 8/61 |

FOREIGN PATENT DOCUMENTS

| | | | |
|---|---|---|---|
| CN | 103249027 A | | 8/2013 |
| CN | 103593258 A | | 2/2014 |
| CN | 103685495 A | * | 3/2014 |
| CN | 103744691 A | | 4/2014 |
| CN | 104346206 A | | 2/2015 |
| CN | 105204737 A | * | 12/2015 |
| CN | 105354039 A | | 2/2016 |
| CN | 106506857 A | | 3/2017 |

OTHER PUBLICATIONS

Maximilian Muller, Application features to convey peers' interactions to engage users in a display network, 2015, pp. 267-268. https://dl.acm.org/doi/pdf/10.1145/2757710.2776815 (Year: 2015).*

Rich Maggiani, Method for Installing Software Upgrades with Improved Uninstall Capabilities, 2009, pp. 1-5. file:///C:/Users/mnguyen4/Downloads/IPCOM000178304D.pdf (Year: 2009).*

Hidetoshi Kambe, A Method of Visualizing Inter-module Relations to Support Reuse-based Embedded Software Development, 2008, pp. 598-605. https://ieeexplore.ieee.org/stamp/stamp.jsp?tp=&arnumber=4482761 (Year: 2008).*

* cited by examiner

APPLICATION SOFTWARE INSTALLATION METHOD, DEVICE, AND SERVER

CROSS-REFERENCE TO RELATED APPLICATIONS

This application is a National Stage of International Patent Application No. PCT/CN2019/088467, filed on May 27, 2019, which claims priority to Chinese Patent Application No. 201810673131.4, filed on Jun. 26, 2018 and Chinese Patent Application No. 201810534151.3, filed on May 29, 2018. All of the aforementioned patent applications are hereby incorporated by reference in their entireties.

TECHNICAL FIELD

This application relates to the field of intelligent terminals, and in particular, to an application software installation method, device, and server.

BACKGROUND

With the rapid development of smartphones and the upgrade of operating systems, users change their mobile phones more frequently. When a user actively changes his/her mobile phone, or changes his/her mobile phone due to loss of the mobile phone, application software on the old mobile phone needs to be reinstalled if the application software still needs to be used. At present, most smartphones have applications such as "app store", which provide various types of applications to download and install, but the required application software can only be installed one by one.

Currently, batch installation of application software can be implemented through the software pre-installation package service. Specifically, the server that provides the pre-installation package service can obtain the software installation status of the old mobile phone. The software installation status includes a plurality of pieces of application software, and the plurality of pieces of application software include currently installed and previously installed application software. Then, the new mobile phone can access the server to obtain the software installation status, and then install the plurality of pieces of application software in batches.

However, the user may no longer want to use some application software. If the software pre-installation package service is used, the application software is still installed. The application software needs to be deleted later; otherwise, it may occupy memory. This causes inconvenience to the user.

SUMMARY

Implementations of this application provide an application software installation method, device, and server, so as to add an application software identifier to a to-be-installed application set and/or delete an application software identifier from a to-be-installed application set.

A first aspect of this application provides an application software installation method, including:

A device accesses a server, and then receives an editing operation of a user for a to-be-installed application set in the server. The to-be-installed application set includes N application software identifiers, where N is a positive integer, and the N application software identifiers are used to indicate corresponding to-be-installed application software. The to-be-installed application software is application software backed up by another device on the server. In this case, the device can send an editing instruction for the to-be-installed application set to the server based on the editing operation. The editing instruction is used to instruct the server to add an application software identifier to the to-be-installed application set and/or delete an application software identifier from the to-be-installed application set, so that the server obtains an updated to-be-installed application set.

The user can use the device to perform the editing operation on the to-be-installed application set in the server, so as to add an application software identifier to the to-be-installed application set and/or delete an application software identifier from the to-be-installed application set. The to-be-installed application set includes N application software identifiers, and the N application software identifiers are used to indicate corresponding to-be-installed application software. The to-be-installed application software is application software backed up by another device on the server. Therefore, in comparison with the case in which only a default to-be-installed application set can be installed, in this application, the to-be-installed application set required by the user can be personalized to meet the personalized software application installation needs of the user.

In some feasible embodiments, after sending the editing instruction for the to-be-installed application set to the server based on the editing operation, the device may further receive the installation operation of the user for application software indicated by the updated to-be-installed application set. The device installs the application software indicated by the updated to-be-installed application set. The user can install the application software indicated by the updated to-be-installed application set on the device, and the updated to-be-installed application set is obtained by performing the editing operation on the to-be-installed application set. Therefore, in comparison with the case in which only a default to-be-installed application set can be installed, in this application, the to-be-installed application set required by the user can be personalized to meet the personalized software application installation needs of the user.

In some feasible embodiments, before receiving the installation operation of the user for the application software indicated by the updated to-be-installed application set, the device further displays a batch installation key. The installation operation is that the user taps the batch installation key. Because the user can install the updated to-be-installed application set in the device in batches, instead of installation one by one, operation steps are reduced, facilitating the operation of the user.

In some feasible embodiments, that the device installs the application software indicated by the updated to-be-installed application set includes: the device determines application software that has not been installed in the device among the application software indicated by the updated to-be-installed application set, and then installs the application software that has not been installed. Because the device may have one or more pieces of application software in the updated to-be-installed application set, installing only the application software that has not been installed in the device can pertinently meet the needs of the user without repeated installation, thereby reducing computing resources and bandwidth resources.

In some feasible embodiments, that the device installs the application software indicated by the updated to-be-installed application set includes: the device determines application software that has been installed in the device among the application software indicated by the updated to-be-installed application set, then determines application software not of a currently latest version among the application software that has been installed, and finally upgrades the application software not of a currently latest version to the currently latest version. In some feasible embodiments, whether a version of the installed application software is latest can be detected. In some feasible embodiments, the currently latest version of the same application software can be detected by visiting the application store. If it is detected that the version of the installed application software is latest, no processing is required. If the version of the installed application software is not latest, the installed application software can be upgraded to the currently latest version. For example, if the currently latest version of WeChat is 6.5, and WeChat on the device is WeChat 6.4, an installation package of WeChat 6.4 can be downloaded and installed, so that WeChat is upgraded to the latest version WeChat 6.5. If WeChat on the device is WeChat 6.5, no processing is required.

The version of the installed application software among the application software indicated by the updated to-be-installed application set may not be currently latest, and may be upgraded to the currently latest version, so that the user does not need to upgrade the application software one by one. This facilitates the operation of the user.

In some feasible embodiments, before upgrading the application software not of a currently latest version to the currently latest version, the device may further receive the upgrade operation of the user for the application software not of a currently latest version, and then perform the step of upgrading the application software not of a currently latest version to the currently latest version based on the upgrade operation. In some scenarios, for example, device memory is insufficient or traffic is charged, the user may temporarily not upgrade the currently in-service application software not of a currently latest version to the currently latest version based on the foregoing operation.

In some feasible embodiments, before receiving the upgrade operation of the user for the application software indicated by the application set whose version is not latest, the device may further display an upgrade prompt for application software indicated by any application software identifier in the application set whose version is not latest. The upgrade prompt includes a confirmation key and a cancellation key. The upgrade operation is that the user taps the confirmation key. The user can determine, based on a definite operation, whether to upgrade the application software not of a currently latest version.

In some feasible embodiments, the editing operation includes an application deletion operation and/or an application adding operation. When the editing operation is the application deletion operation, the editing instruction is used to instruct the server to delete a first application software identifier belonging to the to-be-installed application set from the to-be-installed application set, so that the server obtains the updated to-be-installed application set. The updated to-be-installed application set does not include the first application software identifier. In addition/Alternatively, when the editing operation is the application adding operation, the editing instruction is used to instruct the server to add a second application software identifier not belonging to the to-be-installed application set to the to-be-installed application set, so that the server obtains the updated to-be-installed application set. The updated to-be-installed application set includes the second application software identifier.

In some feasible embodiments, when the editing operation is the application deletion operation, before the device receives the editing operation of the user for the to-be-installed application set, the method further includes: the device displays a deletion key corresponding to any one of the N application software identifiers; the application deletion operation includes: the user taps the deletion key corresponding to any one of the N application software identifiers; alternatively, when the editing operation is the application adding operation, before the device receives the editing operation of the user for the to-be-installed application set, the method further includes: the device displays an addition key corresponding to any one of M application software identifiers on the application store, where M is a positive integer, and any one of the M application identifiers is used to indicate corresponding application software; the application adding operation includes: the user taps the addition key corresponding to any one of the M application software identifiers.

Because the user can delete the application software in the to-be-installed application set, when the installation is performed, unnecessary or unwanted application software is not installed, instead of installing application software and then deleting it one by one. This reduces operation steps, facilitating the operation of the user. Because the user can add application software to the to-be-installed application set based on personal needs, the personalized software application installation needs of the user are met.

In some feasible embodiments, when the editing operation is the application deletion operation, after sending the editing instruction for the to-be-installed application set to the server based on the editing operation, the device may further receive the restoration operation of the user for the first application software identifier, and then send a restoration instruction for the first application software identifier to the server based on the restoration operation; the restoration instruction is used to instruct the server to restore the first application software identifier in the updated to-be-installed application set, so that the updated to-be-installed application set includes the first application software identifier. Before receiving the restoration operation of the user for the first application software identifier, the device may further display a restoration key corresponding to the first application software identifier; the restoration operation includes: the user taps the restoration key. In some scenarios, if the user deletes the first application software identifier by mistake, or when the user needs the application software indicated by the first application software identifier again, the application software can be restored based on the restoration operation.

In some feasible embodiments, before receiving the restoration operation of the user for the first application software identifier, the device may further display a first pane and a second pane based on the operation of the user, where the first pane is used to display the application software in the updated to-be-installed application set, and the second pane is used to display the first application software identifier and the key for restoring the first software application identifier. Through the split-screen display, the user does not need to switch the operation interface when performing a deletion operation or an adding operation, facilitating the operation of the user.

In some feasible embodiments, that the device accesses the server includes: the device accesses the server by logging in to an associated account, where the associated account corresponds to the to-be-installed application set. After the device accesses the server by logging in to the associated account, if third application software not belonging to the to-be-installed application set has been installed in the device, the device may further send an adding operation for a third application software identifier to the server. The third application software identifier indicates the third application software, so that the server adds the third application software identifier to the to-be-installed application set based on the adding operation.

In an implementation of this application, the device sends the account information to the server, so that the server performs user authentication based on the account information. If the user authentication succeeds, the device receives an authentication success message sent by the server, and the device logs in to the associated account on the server based on the authentication success message. It should be noted that the associated account may be registered by the user on the device, or may be registered on another device, which is not limited herein. The associated account can be logged in on any intelligent device with corresponding software and hardware capabilities; to be specific, the associated account may have been logged in on a plurality of devices, which is not limited herein.

After the device accesses the server by logging in to the associated account, the server can obtain the third application software on the device and add the third application software to the to-be-installed application set. Therefore, when another device is used to access the server by logging in to the associated account, the application software indicated by the to-be-installed application set can also be installed, so that when the user loses the device, there is no need to reinstall the application software one by one. Instead, the user can access the server by logging in to the associated account, so as to install the application software indicated by the to-be-installed application set, facilitating the operation of the user.

In some feasible embodiments, before receiving the editing operation of the user for the to-be-installed application set, the device may further send a login request regarding the associated account to the server. The associated account corresponds to the to-be-installed application set. In this case, the device receives a user information input field sent by the server, then receives user-input account information of the associated account in the user information input field, and finally sends the account information to the server, so that the server performs user authentication based on the account information. If the user authentication succeeds, the device receives an authentication success message sent by the server, and the device logs in to the associated account on the server based on the authentication success message. Due to confidential treatment, another user is prevented from using or tampering with the to-be-installed application set.

A second aspect of this application further provides an application software installation method, including:

A server accesses a device. The server receives an editing instruction for a to-be-installed application set from the device. The to-be-installed application set includes N application software identifiers, where N is a positive integer, and the N application software identifiers are used to indicate corresponding to-be-installed application software. The to-be-installed application software is application software backed up by another device on the server. The server adds an application software identifier to the to-be-installed application set and/or deletes an application software identifier from the to-be-installed application set based on the editing instruction, so as to obtain an updated to-be-installed application set.

The user can use the device to perform the editing operation on the to-be-installed application set in the server, so as to add an application software identifier to the to-be-installed application set and/or delete an application software identifier from the to-be-installed application set. The to-be-installed application set includes N application software identifiers, and the N application software identifiers are used to indicate corresponding to-be-installed application software. The to-be-installed application software is application software backed up by another device on the server. Therefore, in comparison with the case in which only a default to-be-installed application set can be installed, in this application, the to-be-installed application set required by the user can be personalized to meet the personalized software application installation needs of the user.

In some feasible embodiments, the editing operation includes an application deletion operation and/or an application adding operation. When the editing operation is the application deletion operation, the server deletes a first application software identifier belonging to the to-be-installed application set from the to-be-installed application set based on the editing instruction, so as to obtain the updated to-be-installed application set. The updated to-be-installed application set does not include the first application software identifier. In addition/Alternatively, when the editing operation is the application adding operation, the server adds a second application software identifier not belonging to the to-be-installed application set to the to-be-installed application set based on the editing instruction, so as to obtain the updated to-be-installed application set. The updated to-be-installed application set includes the second application software identifier.

Because the user can delete the application software in the to-be-installed application set, when the installation is performed, unnecessary or unwanted application software is not installed, instead of installing application software and then deleting it one by one. This reduces operation steps, facilitating the operation of the user. Because the user can add application software to the to-be-installed application set based on personal needs, the personalized software application installation needs of the user are met.

In some feasible embodiments, when the editing operation is the application deletion operation, after the server deletes the first application software identifier belonging to the to-be-installed application set from the to-be-installed application set based on the editing instruction, the method further includes: the server receives a restoration instruction that is for the first application software identifier and that is sent by the device; the server restores the first application software identifier in the updated to-be-installed application set based on the restoration instruction, so that the updated to-be-installed application set includes the first application software identifier. In some scenarios, if the user deletes the first application software identifier by mistake, or when the user needs the application software indicated by the first application software identifier again, the application software can be restored based on the restoration operation.

In some feasible embodiments, that the service accesses the device includes: the server accepts access of the device performed by logging in to an associated account, where the associated account corresponds to the to-be-installed application set. In some feasible embodiments, after the server accepts the access of the device performed by logging in to the associated account, the method further includes: if third application software not belonging to the to-be-installed application set has been installed in the device, the server receives an adding operation that is for a third application software identifier and that is sent by the device. The third application software identifier is used to indicate the third application software. The server adds the third application software identifier to the to-be-installed application set based on the adding operation.

After the device accesses the server by logging in to the associated account, the server can obtain the third application software on the device and add the third application software to the to-be-installed application set. Therefore, when another device is used to access the server by logging in to the associated account, the application software indicated by the to-be-installed application set can also be installed, so that when the user loses the device, there is no need to reinstall the application software one by one. Instead, the user can access the server by logging in to the associated account, so as to install the application software indicated by the to-be-installed application set, facilitating the operation of the user.

A third aspect of this application further provides an application software installation device, including:

a communications port, an interaction module, and at least one processor. The communications port is configured to access a server. The interaction module is configured to receive an editing operation of the user for a to-be-installed application set in the server. The to-be-installed application set includes N application software identifiers, where N is a positive integer, and the N application software identifiers are used to indicate corresponding to-be-installed application software. The to-be-installed application software is application software backed up by another device on the server. The at least one processor is configured to perform the following step: generating an editing instruction for the to-be-installed application set based on the editing operation. The editing instruction is used to instruct to add an application software identifier to the to-be-installed application set and/or delete an application software identifier from the to-be-installed application set. The communications port is further configured to send the editing instruction to the server, so that the server adds an application software identifier to the to-be-installed application set and/or deletes an application software identifier from the to-be-installed application set based on the editing instruction, so as to obtain an updated to-be-installed application set.

The user can use the device to perform the editing operation on the to-be-installed application set in the server, so as to add an application software identifier to the to-be-installed application set and/or delete an application software identifier from the to-be-installed application set. The to-be-installed application set includes N application software identifiers, and the N application software identifiers are used to indicate corresponding to-be-installed application software. The to-be-installed application software is application software backed up by another device on the server. Therefore, in comparison with the case in which only a default to-be-installed application set can be installed, in this application, the to-be-installed application set required by the user can be personalized to meet the personalized software application installation needs of the user.

In some feasible embodiments, after the step of sending the editing instruction for the to-be-installed application set to the server based on the editing operation, the interaction module is further configured to receive the installation operation of the user for application software indicated by the updated to-be-installed application set.

The at least one processor is configured to install the application software indicated by the updated to-be-installed application set.

The user can install the application software indicated by the updated to-be-installed application set on the device, and the updated to-be-installed application set is obtained by performing the editing operation on the to-be-installed application set. Therefore, in comparison with the case in which only a default to-be-installed application set can be installed, in this application, the to-be-installed application set required by the user can be personalized to meet the personalized software application installation needs of the user.

In some feasible embodiments, in the step of installing the application software indicated by the updated to-be-installed application set, the at least one processor is further configured to perform the following steps:

determining application software that has not been installed in the device among the application software indicated by the updated to-be-installed application set; and installing the application software that has not been installed.

Because the device may have one or more pieces of application software in the updated to-be-installed application set, installing only the application software that has not been installed in the device can pertinently meet the needs of the user without repeated installation, thereby reducing computing resources and bandwidth resources.

In some feasible embodiments, application software that has been installed in the device among the application software indicated by the updated to-be-installed application set is determined;

application software not of a currently latest version among the application software that has been installed is determined; and the application software not of a currently latest version is upgraded to the currently latest version.

The version of the installed application software among the application software indicated by the updated to-be-installed application set may not be currently latest, and may be upgraded to the currently latest version, so that the user does not need to upgrade the application software one by one. This facilitates the operation of the user.

In some feasible embodiments, the interaction module is further configured to receive the upgrade operation of the user for the application software not of a currently latest version:

the at least one processor is further configured to perform the step of upgrading the application software not of a currently latest version to the currently latest version based on the upgrade operation.

In some scenarios, for example, device memory is insufficient or traffic is charged, the user may temporarily not upgrade the currently in-service application software not of a currently latest version to the currently latest version based on the foregoing operation.

In some feasible embodiments, the editing operation includes an application deletion operation and/or an application adding operation. When the editing operation is the application deletion operation, the editing instruction is used to instruct the server to delete a first application software identifier belonging to the to-be-installed application set from the to-be-installed application set, so that the server obtains the updated to-be-installed application set. The updated to-be-installed application set does not include the first application software identifier. In addition/Alternatively, when the editing operation is the application adding operation, the editing instruction is used to instruct the server to add a second application software identifier not belonging to the to-be-installed application set to the to-be-installed application set, so that the server obtains the updated to-be-installed application set. The updated to-be-installed application set includes the second application software identifier.

Because the user can delete the application software in the to-be-installed application set, when the installation is performed, unnecessary or unwanted application software is not installed, instead of installing application software and then deleting it one by one. This reduces operation steps, facilitating the operation of the user. Because the user can add application software to the to-be-installed application set based on personal needs, the personalized software application installation needs of the user are met.

In some feasible embodiments, when the editing operation is the application deletion operation, after the step of sending the editing instruction for the to-be-installed application set to the server by the device, the at least one processor is further configured to perform the following steps: the interaction module is configured to receive the restoration operation of the user for the first application software identifier;

the communications port is further configured to send a restoration instruction for the first application software identifier to the server based on the restoration operation; the restoration instruction is used to instruct the server to restore the first application software identifier in the updated to-be-installed application set, so that the updated to-be-installed application set includes the first application software identifier.

In some scenarios, if the user deletes the first application software identifier by mistake, or when the user needs the application software indicated by the first application software identifier again, the application software can be restored based on the restoration operation.

In some feasible embodiments, before the step of receiving the restoration operation of the user for the first application software identifier, the interaction module is further configured to display a first pane and a second pane based on the operation of the user, where the first pane is used to display the application software in the updated to-be-installed application set, and the second pane is used to display the first application software identifier and the key for restoring the first software application identifier.

Through the split-screen display, the user does not need to switch the operation interface when performing a deletion operation or an adding operation, facilitating the operation of the user.

In some feasible embodiments, in the step of accessing the server, the communications port is further configured to access the server by the device by logging in to an associated account, where the associated account corresponds to the to-be-installed application set.

In some feasible embodiments, after the step of accessing the server by logging in to the associated account, the communications port is further configured to: if third application software not belonging to the to-be-installed application set has been installed in the device, send an adding operation for a third application software identifier to the server. The third application software identifier indicates the third application software, so that the server adds the third application software identifier to the to-be-installed application set based on the adding operation.

After the device accesses the server by logging in to the associated account, the server can obtain the third application software on the device and add the third application software to the to-be-installed application set. Therefore, when another device is used to access the server by logging in to the associated account, the application software indicated by the to-be-installed application set can also be installed, so that when the user loses the device, there is no need to reinstall the application software one by one. Instead, the user can access the server by logging in to the associated account, so as to install the application software indicated by the to-be-installed application set, facilitating the operation of the user.

A fourth aspect of this application further provides an application software installation server, including:

a communications port and at least one processor. The communications port is configured to access a device. The communications port is further configured to receive an editing instruction for a to-be-installed application set from the device. The to-be-installed application set includes N application software identifiers, where N is a positive integer, and the N application software identifiers are used to indicate corresponding to-be-installed application software. The to-be-installed application software is application software backed up by another device on the server. The at least one processor is configured to perform the following step: adding an application software identifier to the to-be-installed application set and/or deleting an application software identifier from the to-be-installed application set based on the editing instruction, so as to obtain an updated to-be-installed application set.

The user can use the device to perform the editing operation on the to-be-installed application set in the server, so as to add an application software identifier to the to-be-installed application set and/or delete an application software identifier from the to-be-installed application set. The to-be-installed application set includes N application software identifiers, and the N application software identifiers are used to indicate corresponding to-be-installed application software. The to-be-installed application software is application software backed up by another device on the server. Therefore, in comparison with the case in which only a default to-be-installed application set can be installed, in this application, the to-be-installed application set required by the user can be personalized to meet the personalized software application installation needs of the user.

In some feasible embodiments, the editing operation includes an application deletion operation and/or an application adding operation. When the editing operation is the application deletion operation, the server deletes a first application software identifier belonging to the to-be-installed application set from the to-be-installed application set based on the editing instruction, so as to obtain the updated to-be-installed application set. The updated to-be-installed application set does not include the first application software identifier. In addition/Alternatively, when the editing operation is the application adding operation, the server adds a second application software identifier not belonging to the to-be-installed application set to the to-be-installed application set based on the editing instruction, so as to obtain the updated to-be-installed application set. The updated to-be-installed application set includes the second application software identifier.

Because the user can delete the application software in the to-be-installed application set, when the installation is performed, unnecessary or unwanted application software is not installed, instead of installing application software and then deleting it one by one. This reduces operation steps, facilitating the operation of the user. Because the user can add application software to the to-be-installed application set based on personal needs, the personalized software application installation needs of the user are met.

In some feasible embodiments, when the editing operation is the application deletion operation, after the step of deleting, by the server, the first application software identifier belonging to the to-be-installed application set from the to-be-installed application set based on the editing instruction, the communications port is configured to receive a restoration instruction that is for the first application software identifier and that is sent by the device;

the at least one processor is further configured to restore the first application software identifier in the updated to-be-installed application set based on the restoration instruction, so that the updated to-be-installed application set includes the first application software identifier.

In some scenarios, if the user deletes the first application software identifier by mistake, or when the user needs the application software indicated by the first application software identifier again, the application software can be restored based on the restoration operation.

In some feasible embodiments, in the step of accessing the device by the server, the communications port is further configured to accept access of the device performed by logging in to an associated account, where the associated account corresponds to the to-be-installed application set.

In some feasible embodiments, after the step of accepting the access of the device performed by logging in to the associated account, the communications port is further configured to: if third application software not belonging to the to-be-installed application set has been installed in the device, receive an adding operation that is for a third application software identifier and that is sent by the device. The third application software identifier is used to indicate the third application software;

the at least one processor is further configured to add the third application software identifier to the to-be-installed application set based on the adding operation.

After the device accesses the server by logging in to the associated account, the server can obtain the third application software on the device and add the third application software to the to-be-installed application set. Therefore, when another device is used to access the server by logging in to the associated account, the application software indicated by the to-be-installed application set can also be installed, so that when the user loses the device, there is no need to reinstall the application software one by one. Instead, the user can access the server by logging in to the associated account, so as to install the application software indicated by the to-be-installed application set, facilitating the operation of the user.

A fifth aspect of this application further provides an application software installation device, including:

a communications module, configured to access a server; and an interaction module, configured to receive an editing operation of a user for a to-be-installed application set in the server. The to-be-installed application set includes N application software identifiers, where N is a positive integer, and the N application software identifiers are used to indicate corresponding to-be-installed application software. The to-be-installed application software is application software backed up by another device on the server. The communications module is further configured to send an editing instruction for the to-be-installed application set to the server based on the editing operation. The editing instruction is used to instruct the server to add an application software identifier to the to-be-installed application set and/or delete an application software identifier from the to-be-installed application set, so that the server obtains an updated to-be-installed application set.

The user can use the device to perform the editing operation on the to-be-installed application set in the server, so as to add an application software identifier to the to-be-installed application set and/or delete an application software identifier from the to-be-installed application set. The to-be-installed application set includes N application software identifiers, and the N application software identifiers are used to indicate corresponding to-be-installed application software. The to-be-installed application software is application software backed up by another device on the server. Therefore, in comparison with the case in which only a default to-be-installed application set can be installed, in this application, the to-be-installed application set required by the user can be personalized to meet the personalized software application installation needs of the user.

In some feasible embodiments, the interaction module is further configured to receive the installation operation of the user for application software indicated by the updated to-be-installed application set; a processing module is configured to install the application software indicated by the updated to-be-installed application set.

The user can install the application software indicated by the updated to-be-installed application set on the device, and the updated to-be-installed application set is obtained by performing the editing operation on the to-be-installed application set. Therefore, in comparison with the case in which only a default to-be-installed application set can be installed, in this application, the to-be-installed application set required by the user can be personalized to meet the personalized software application installation needs of the user.

In some feasible embodiments, the processing module includes: a determining submodule, configured to determine application software that has not been installed in the device among the application software indicated by the updated to-be-installed application set; and an installation submodule, configured to install the application software that has not been installed.

Because the device may have one or more pieces of application software in the updated to-be-installed application set, installing only the application software that has not been installed in the device can pertinently meet the needs of the user without repeated installation, thereby reducing computing resources and bandwidth resources.

In some feasible embodiments, the installation submodule is specifically configured to: determine application software that has been installed in the device among the application software indicated by the updated to-be-installed application set; then determine application software not of a currently latest version among the application software that has been installed; and finally upgrade the application software not of a currently latest version to the currently latest version.

The version of the installed application software among the application software indicated by the updated to-be-installed application set may not be currently latest, and may be upgraded to the currently latest version, so that the user does not need to upgrade the application software one by one. This facilitates the operation of the user.

In some feasible embodiments, the installation submodule is specifically further configured to: receive the upgrade operation of the user for the application software not of a currently latest version; perform the step of upgrading the application software not of a currently latest version to the currently latest version based on the upgrade operation. In some scenarios, for example, device memory is insufficient or traffic is charged, the user may temporarily not upgrade the currently in-service application software not of a currently latest version to the currently latest version based on the foregoing operation.

In some feasible embodiments, the editing operation includes an application deletion operation and/or an application adding operation. When the editing operation is the application deletion operation, the editing instruction is used to instruct the server to delete a first application software identifier belonging to the to-be-installed application set from the to-be-installed application set, so that the server obtains the updated to-be-installed application set. The updated to-be-installed application set does not include the first application software identifier. In addition/Alternatively, when the editing operation is the application adding operation, the editing instruction is used to instruct the server to add a second application software identifier not belonging to the to-be-installed application set to the to-be-installed application set, so that the server obtains the updated to-be-installed application set. The updated to-be-installed application set includes the second application software identifier.

Because the user can delete the application software in the to-be-installed application set, when the installation is performed, unnecessary or unwanted application software is not installed, instead of installing application software and then deleting it one by one. This reduces operation steps, facilitating the operation of the user. Because the user can add application software to the to-be-installed application set based on personal needs, the personalized software application installation needs of the user are met.

In some feasible embodiments, the communications module is specifically configured to:

receive the restoration operation of the user for the first application software identifier; and send a restoration instruction for the first application software identifier to the server based on the restoration operation; the restoration instruction is used to instruct the server to restore the first application software identifier in the updated to-be-installed application set, so that the updated to-be-installed application set includes the first application software identifier. In some scenarios, if the user deletes the first application software identifier by mistake, or when the user needs the application software indicated by the first application software identifier again, the application software can be restored based on the restoration operation.

In some feasible embodiments, the interaction module is specifically further configured to:

display a first pane and a second pane based on the operation of the user, where the first pane is used to display the application software in the updated to-be-installed application set, and the second pane is used to display the first application software identifier and the key for restoring the first software application identifier. Through the split-screen display, the user does not need to switch the operation interface when performing a deletion operation or an adding operation, facilitating the operation of the user.

In some feasible embodiments, the communications module is specifically further configured to:

access the server by logging in to an associated account, where the associated account corresponds to the to-be-installed application set.

In some feasible embodiments, the communications module is specifically further configured to: if third application software not belonging to the to-be-installed application set has been installed in the device, send an adding operation for a third application software identifier to the server. The third application software identifier indicates the third application software, so that the server adds the third application software identifier to the to-be-installed application set based on the adding operation.

After the device accesses the server by logging in to the associated account, the server can obtain the third application software on the device and add the third application software to the to-be-installed application set. Therefore, when another device is used to access the server by logging in to the associated account, the application software indicated by the to-be-installed application set can also be installed, so that when the user loses the device, there is no need to reinstall the application software one by one. Instead, the user can access the server by logging in to the associated account, so as to install the application software indicated by the to-be-installed application set, facilitating the operation of the user.

A sixth aspect of this application further provides an application software installation server, including:

a communications module, configured to access a device, where the communications module is further configured to receive an editing instruction for a to-be-installed application set from the device; the to-be-installed application set includes N application software identifiers, where N is a positive integer, and the N application software identifiers are used to indicate corresponding to-be-installed application software; the to-be-installed application software is application software backed up by another device on the server; and a processing module, configured to add an application software identifier to the to-be-installed application set and/or delete an application software identifier from the to-be-installed application set based on the editing instruction, so as to obtain an updated to-be-installed application set.

The user can use the device to perform the editing operation on the to-be-installed application set in the server, so as to add an application software identifier to the to-be-installed application set and/or delete an application software identifier from the to-be-installed application set. The to-be-installed application set includes N application software identifiers, and the N application software identifiers are used to indicate corresponding to-be-installed application software. The to-be-installed application software is application software backed up by another device on the server. Therefore, in comparison with the case in which only a default to-be-installed application set can be installed, in this application, the to-be-installed application set required by the user can be personalized to meet the personalized software application installation needs of the user.

In some feasible embodiments, the editing operation includes an application deletion operation and/or an application adding operation, and the processing module is specifically configured to:

when the editing operation is the application deletion operation, delete a first application software identifier belonging to the to-be-installed application set from the to-be-installed application set based on the editing instruction, so as to obtain the updated to-be-installed application set, where the updated to-be-installed application set does not include the first application software identifier; and/or, when the editing operation is the application adding operation, add a second application software identifier not belonging to the to-be-installed application set to the to-be-installed application set based on the editing instruction, so as to obtain the updated to-be-installed application set, where the updated to-be-installed application set includes the second application software identifier.

Because the user can delete the application software in the to-be-installed application set, when the installation is performed, unnecessary or unwanted application software is not installed, instead of installing application software and then deleting it one by one. This reduces operation steps, facilitating the operation of the user. Because the user can add application software to the to-be-installed application set based on personal needs, the personalized software application installation needs of the user are met.

In some feasible embodiments, when the editing operation is the application deletion operation, the communications module is further configured to:

receive a restoration instruction that is for the first application software identifier and that is sent by the device; and restore the first application software identifier in the updated to-be-installed application set based on the restoration instruction, so that the updated to-be-installed application set includes the first application software identifier. In some scenarios, if the user deletes the first application software identifier by mistake, or when the user needs the application software indicated by the first application software identifier again, the application software can be restored based on the restoration operation.

In some feasible embodiments, the communications module is specifically further configured to:

accept access of the device performed by logging in to an associated account, where the associated account corresponds to the to-be-installed application set.

In some feasible embodiments, the communications module is further configured to: if third application software not belonging to the to-be-installed application set has been installed in the device, receive an adding operation that is for a third application software identifier and that is sent by the device, where the third application software identifier is used to indicate the third application software; and the processing module is further configured to add the third application software identifier to the to-be-installed application set based on the adding operation.

After the device accesses the server by logging in to the associated account, the server can obtain the third application software on the device and add the third application software to the to-be-installed application set. Therefore, when another device is used to access the server by logging in to the associated account, the application software indicated by the to-be-installed application set can also be installed, so that when the user loses the device, there is no need to reinstall the application software one by one. Instead, the user can access the server by logging in to the associated account, so as to install the application software indicated by the to-be-installed application set, facilitating the operation of the user.

Another aspect of this application provides a computer readable storage medium. The computer readable storage medium stores an instruction. When the instruction runs on a computer, the computer is enabled to perform the methods in the foregoing aspects.

It can be learned from the foregoing technical solutions that, the implementations of this application have the following advantages:

The user can use the device to perform the editing operation on the to-be-installed application set in the server, so as to add an application software identifier to the to-be-installed application set and/or delete an application software identifier from the to-be-installed application set. The to-be-installed application set includes N application software identifiers, and the N application software identifiers are used to indicate corresponding to-be-installed application software. The to-be-installed application software is application software backed up by another device on the server. Therefore, in comparison with the case in which only a default to-be-installed application set can be installed, in this application, the to-be-installed application set required by the user can be personalized to meet the personalized software application installation needs of the user.

BRIEF DESCRIPTION OF DRAWINGS

FIG. 4-1 is another schematic diagram of an application software installation method:

FIG. 4-2 is a schematic diagram of a form in which a first device displays application software of an application software pre-installation service;

FIG. 4-3 is a schematic diagram of an interface of an application software pre-installation service:

FIG. 4-4 shows an interface for receiving user-input account information;

FIG. 4-5 is a schematic diagram of a user-input account and password;

FIG. 4-6 is a schematic diagram of displaying a to-be-installed application set of an associated account by a first device;

FIG. 4-7 is a schematic diagram of performing split-screen display by a first device:

FIG. 4-8 is a schematic diagram of updating a to-be-installed application set by a first device:

FIG. 4-9 is a schematic diagram of batch installation of a to-be-installed application set:

FIG. 4-10 is a schematic diagram of an upgrade dialog box:

FIG. 4-11 is a schematic diagram of upgrading first application software;

FIG. 4-12 is a schematic diagram of performing a restoration operation on K pieces of application software in deleted application software by a user;

FIG. 4-13 is a schematic diagram of a first device on which third application software has been installed:

FIG. 4-14 is a schematic diagram of an updated to-be-installed application set:

FIG. 5 is a schematic diagram of an application software installation device;

FIG. 6 is a schematic diagram of an application software installation server;

FIG. 7 is a schematic diagram of an application software installation device;

FIG. 8 is another schematic diagram of an application software installation device; and FIG. 9 is a schematic diagram of an application software installation server.

DESCRIPTION OF EMBODIMENTS

Implementations of this application provide an application software installation method, device, and server, so as to add an application software identifier to a to-be-installed application set and/or delete an application software identifier from a to-be-installed application set.

To make the technical solutions in the embodiments of this application more comprehensible, the following clearly describes the technical solutions in the embodiments of this application with reference to the accompanying drawings in the embodiments of this application. Clearly, the described embodiments are merely some but not all of the embodiments of this application.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Figure 1:
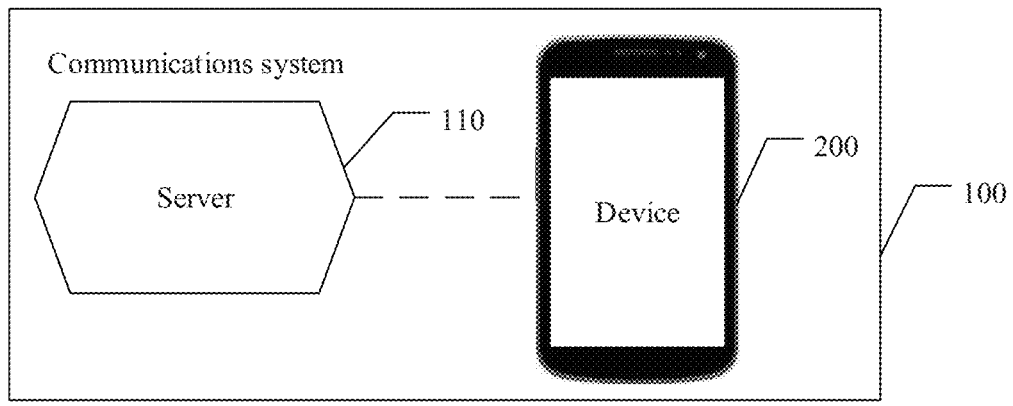
FIG. 1 is a schematic diagram of a communications system.

FIG. 1 shows a communications system 100. The communications system includes a server 110 and a device 200.

In an implementation of this application, the server 110 may include one or more central processing units (central processing units, CPU) (for example, one or more processors), one or more memories, and one or more storage media (for example, one or more mass storage devices) that store an application program or data. The memory and the storage medium may perform temporary storage or permanent storage. The program stored in the storage medium may include one or more modules (not shown in the figure), and each module may include a series of instruction operations for a server. Further, the central processing unit may be configured to communicate with the storage medium, and perform, in the server, the series of instruction operations in the storage medium.

The server 110 may further include one or more power supplies, one or more wired or wireless network interfaces, one or more input/output interfaces, and/or one or more operating systems, for example, Windows Server™, Mac OS X™, Unix™, Linux™, and FreeBSD™.

In some feasible implementations, the server 110 may also be a server using a cloud technology. The cloud technology mentioned herein is an application virtualization (Application Virtualization) technology, which is mainly presented in the form of a software platform and integrates a plurality of functions such as software search, download, use, management, and backup. Through this software platform, various types of common application software can be packaged in an independent virtualized environment, so that the application software is not coupled to the system, and the purpose of using the application software in a green manner is achieved.

Figure 2:
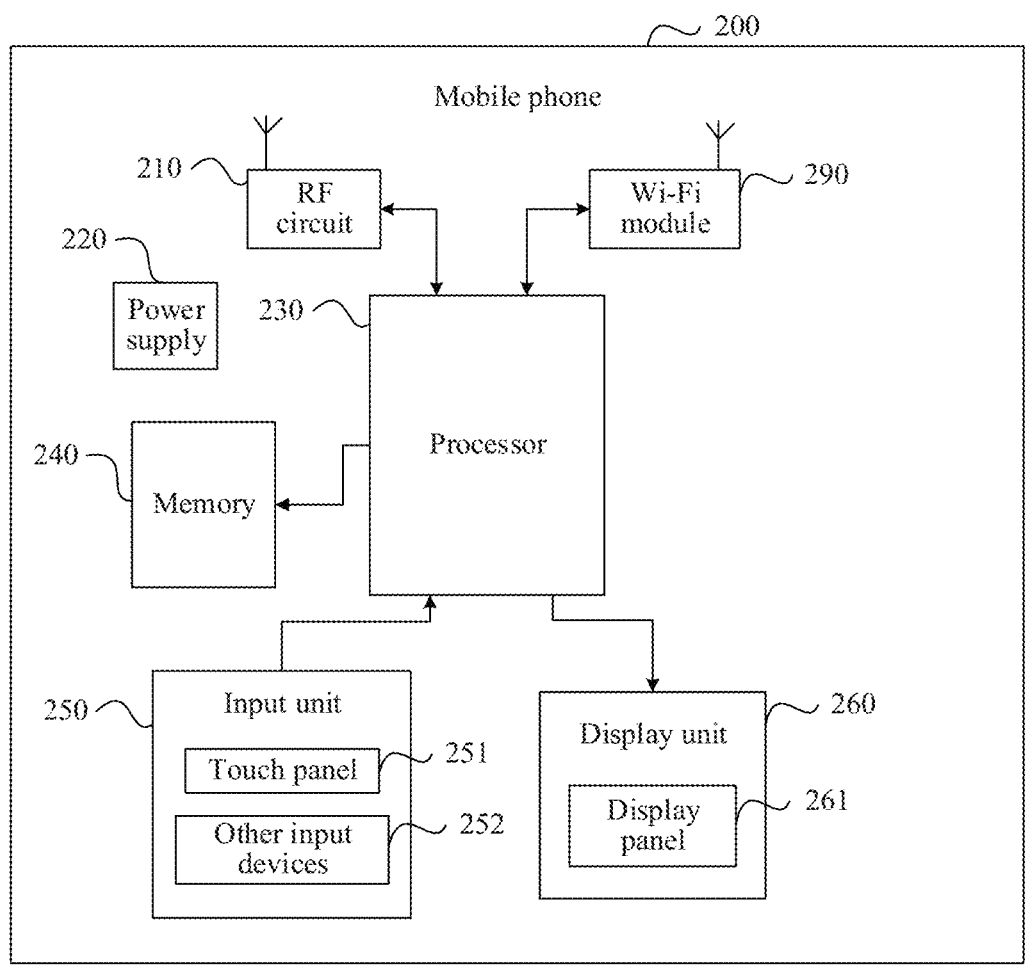
FIG. 2 is a schematic diagram of a partial structure of a mobile phone.

In embodiments of this application, the device 200 may be any terminal device including a mobile phone, a tablet computer, a PDA (Personal Digital Assistant, personal digital assistant), a POS (Point of Sale, point of sale), a vehicle-mounted computer, or the like. For example, the terminal is a mobile phone. FIG. 2 is a schematic diagram of a partial structure of a mobile phone 200 related to the implementation of this application. The mobile phone 200 includes components such as a radio frequency (Radio Frequency, RF) circuit 210, a power supply 220, a processor 230, a memory 240, an input unit 250, a display unit 260, and a wireless fidelity (wireless fidelity, Wi-Fi) module 290. Persons skilled in the art may understand that the structure of the mobile phone shown in FIG. 2 does not constitute a limitation on the mobile phone, and the mobile phone may include components more or fewer than those shown in the figure, or may combine some components, or have different component arrangements.

The following specifically describes the components of the mobile phone 200 with reference to FIG. 2.

The RF circuit 210 may be configured to receive and send a signal in an information receiving and sending process or a call process. In particular, after receiving downlink information from a base station, the RF circuit 210 sends the downlink information to the processor 230 for processing, and in addition, sends uplink related data to the base station. In this application, the RF circuit 210 is specifically configured to exchange data with the base station.

The memory 240 may be configured to store a software program and a module. The processor 230 executes various function applications of the mobile phone 200 by running the software program and the module that are stored in the memory 240. In this application, the memory 240 is specifically used for cache of a data terminal when a personalized software installation package service is used. The memory 240 is configured to store user data of the personalized software installation package, bundled data of an association between a user and an application, and a logic processing module. When the instruction of the user for adding or deleting an application is received from the processor 230, the logic processing module in the memory 240 is run to add or delete the bundled data of an association between a user and an application stored in the memory 240. The input unit 250 may be configured to: receive entered digit or character information, and generate key signal input related to a user setting and function control of the mobile phone 200. The display unit 260 may be configured to display information entered by the user or information provided for the user and various menus of the mobile phone 200. The display unit 26W may include a display panel 261. Optionally, the display panel 261 may be configured in a form of an LCD, an OLED, or the like. Wi-Fi is a short-range wireless transmission technology. By using the Wi-Fi module 290, the mobile phone 200 may help the user send or receive an e-mail, browse a web page, access streaming media, and so on. The Wi-Fi module 290 provides wireless broadband Internet access for the user. In this application, the foregoing components are specifically configured to exchange data when the user uses the personalized software installation package service.

The processor 230 is a control center of the mobile phone 200, connects all parts of the entire mobile phone by using various interfaces and lines, and performs various functions of the mobile phone 200 and data processing by running or executing the software program and/or the module that are/is stored in the memory 240 and by invoking data stored in the memory 240, to implement a plurality of services that are based on the mobile phone. The mobile phone 200 further includes the power supply 220 (such as a battery) supplying power to the components. Preferably, the power supply may be logically connected to the processor 230 by using a power management system, to implement functions such as management of charging, discharging, and energy consumption by using the power management system. Although not shown, the mobile phone 200 may further include a camera, a Bluetooth module, or the like. Details are not described herein.

In implementations of this application, with the rapid development of smartphones and the upgrade of operating systems, users change their mobile phones more frequently. When a user actively changes his/her mobile phone, or changes his/her mobile phone due to loss of the mobile phone, application software on the old mobile phone needs to be reinstalled if the application software needs to be used. At present, most smartphones have applications such as "app store" for installing application software. However, the required application software can only be installed one by one.

Currently, batch installation of application software can be implemented through the software pre-installation package service. Specifically, the server that provides the pre-installation package service can obtain the software installation status of the old mobile phone. The software installation status includes a plurality of pieces of application software, and the plurality of pieces of application software include currently installed and previously installed application software. Then, the new mobile phone can access the server to obtain the software installation status, and then install the plurality of pieces of application software in batches. However, the user may no longer want to use some application software. If the software pre-installation package service is used, the application software is still installed. The application software needs to be deleted later; otherwise, it may occupy memory. This causes inconvenience to the user.

Figure 3:
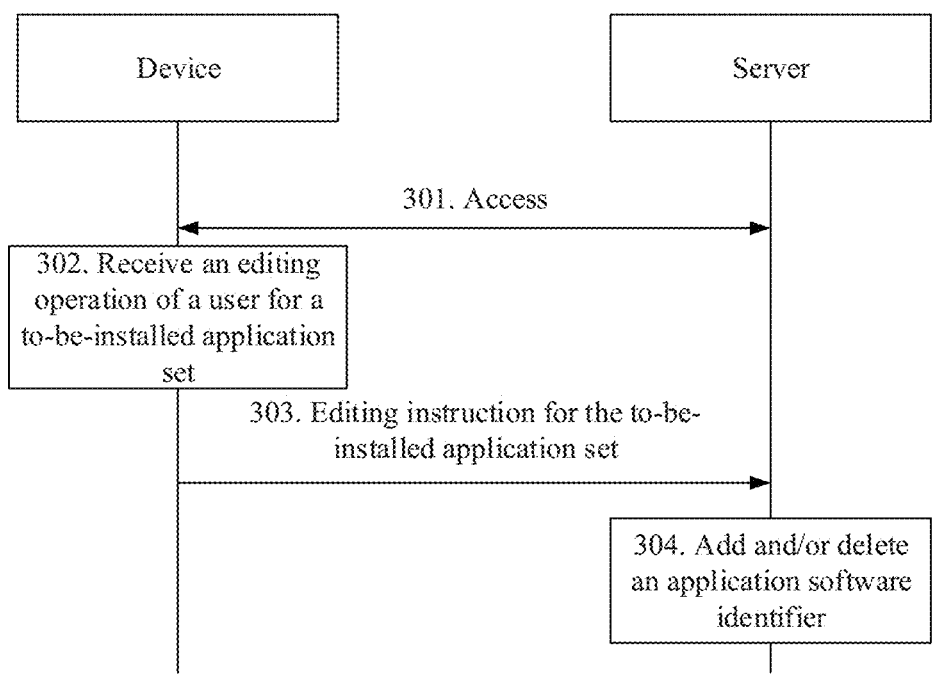
FIG. 3 is a schematic diagram of an application software installation method.

To this end, an implementation of this application provides an application software installation method, as shown in FIG. 3, including.

301. A device accesses a server.

302. The device receives an editing operation of the user for a to-be-installed application set in the server, where the to-be-installed application set includes N application software identifiers, N is a positive integer, the N application software identifiers are used to indicate corresponding to-be-installed application software, and the to-be-installed application software is application software backed up by another device on the server.

303. The device sends an editing instruction for the to-be-installed application set to the server based on the editing operation.

304. The server adds an application software identifier to the to-be-installed application set and/or deletes an application software identifier from the to-be-installed application set based on the editing instruction, so as to obtain an updated to-be-installed application set.

In the implementation of this application, the user can use the device to perform the editing operation on the to-be-installed application set in the server, so as to add an application software identifier to the to-be-installed application set and/or delete an application software identifier from the to-be-installed application set. The to-be-installed application set includes N application software identifiers, and the N application software identifiers are used to indicate corresponding to-be-installed application software. The to-be-installed application software is application software backed up by another device on the server. Therefore, in comparison with the case in which only a default to-be-installed application set can be installed, in this application, the to-be-installed application set required by the user can be personalized to meet the personalized software application installation needs of the user.

Figures 1, 4:
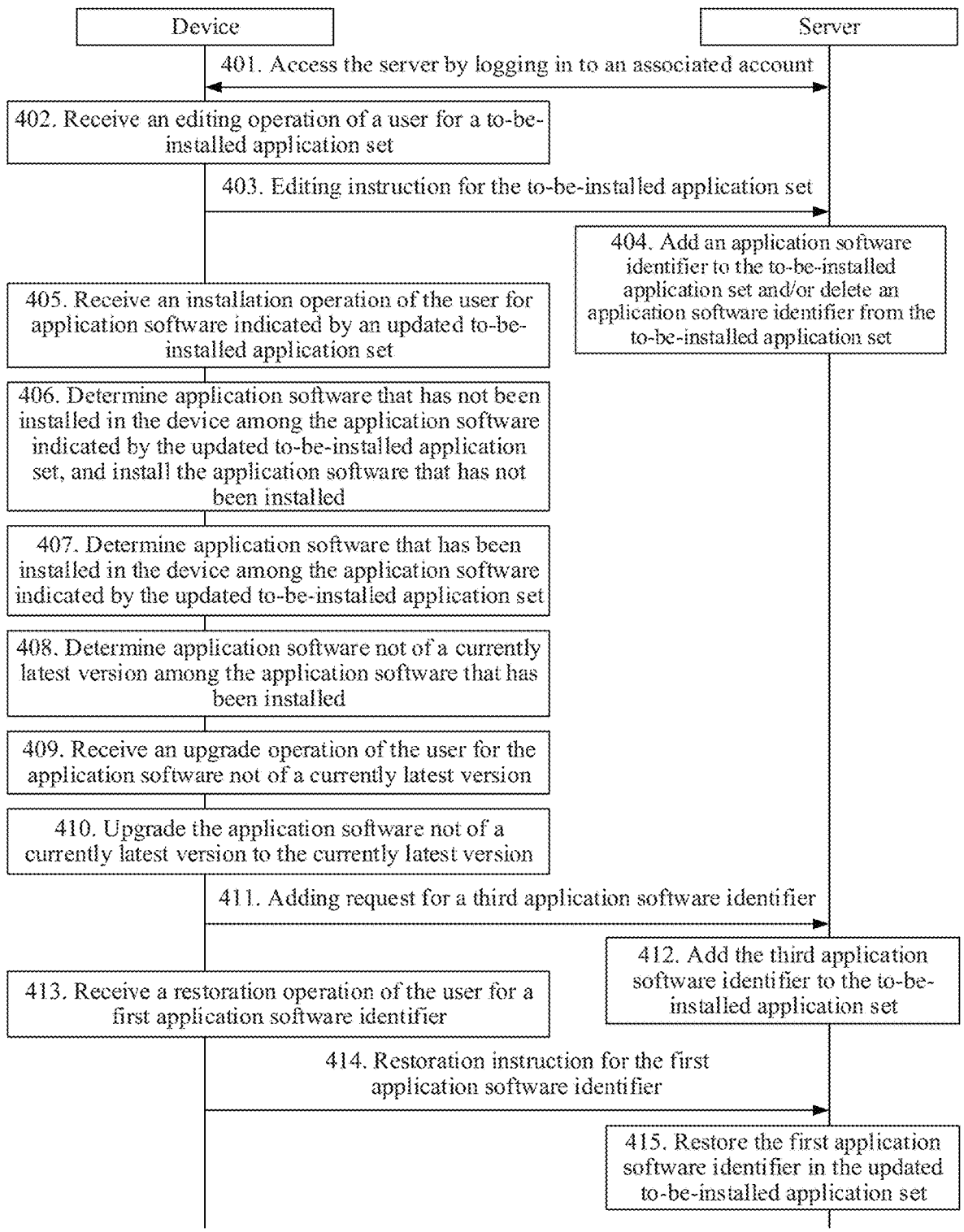
Figures 2, 4:
Figures 3, 4:
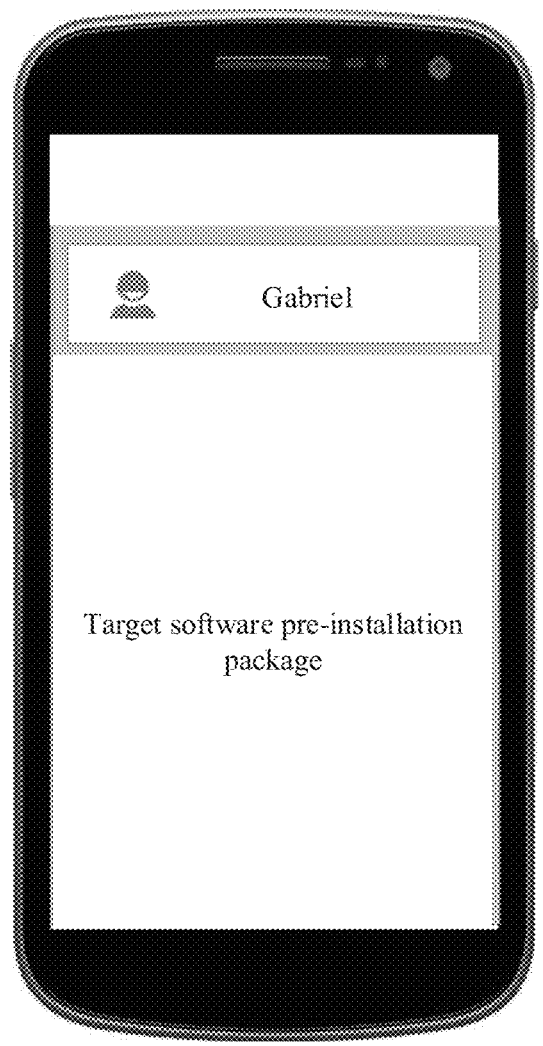
Figure 4:
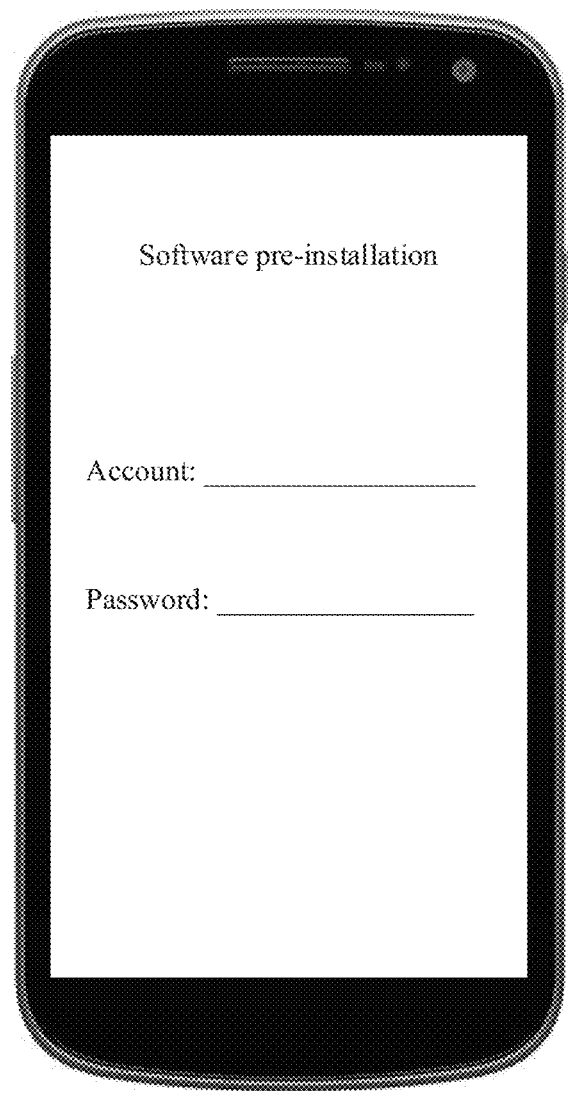

For ease of understanding, the following describes a specific procedure in the implementation of this application. Referring to FIG. 4-1, an implementation of this application provides an application software installation method, including:

401. A device accesses a server by logging in to an associated account.

In some feasible embodiments, the device can access the server offline, that is, update data locally and then transmit the data to the server. In some feasible embodiments, the device can access the server online, that is, data is neither stored nor updated locally. This is not limited.

In some feasible implementations, the device can access the server by logging in to the associated account, so as to connect to the server. In some feasible implementations, the application software pre-installation service provided by the server may be presented in the device in the form of application software. The application software that provides the application software pre-installation service may be standalone application software or a function of other application software, such as a software market, QQPhone Manager, an application store, and Apple software store. It should be noted that the server can provide the application software pre-installation service through the application software that comes with the device, or through the application software downloaded and installed from the application store, which is not limited herein. In some feasible implementations, the application software pre-installation service may also be a function in the device settings, which is not limited herein. In some feasible implementations, the server can also be accessed through another channel to receive the application software pre-installation service, which is not limited herein.

As shown in FIG. 4-2 (which is a schematic diagram of a form in which a device displays application software of an application software pre-installation service), when the user taps "Software Pre-installation" in FIG. 4-2, the device accesses the server and enters an interface provided by the server, as shown in FIG. 4-3 (which is a schematic diagram of an interface of an application software pre-installation service). It should be noted that, the associated account corresponds to the to-be-installed application set, the to-be-installed application set includes N application software identifiers, N is a positive integer, the N application software identifiers are used to indicate corresponding to-be-installed application software, and the to-be-installed application software is application software backed up by another device on the server.

Specifically, the device may send a login request regarding the associated account to the server. The associated account corresponds to the to-be-installed application set. Then, the device receives an account information input field returned by the server, as shown in FIG. 4-4 (which shows an interface for receiving user-input account information). In this case, the device can receive user-input account information of the associated account in the account information input field. It should be noted that, in some feasible embodiments, when the device does not access the server, the device may also display the account information input field offline. However, in this case, the user-input corresponding account information cannot be received by the server, and the effect of the method in the implementation of this application cannot be achieved.

In the implementation of this application, the account information may be an account and a password. The account and the password can be entered as symbols, that is, any combination of numbers, letters (case-sensitive), punctuation marks and other symbols entered through a keyboard. In some feasible implementations, the account and the password can also be entered in any combination of voice recognition, fingerprint recognition, face recognition, iris recognition, and other biometric recognition methods, which are not limited herein. In some feasible implementations, the account information input box may further include a verification code, and verification methods may include mobile phone text message verification, phone voice verification, and verification through identification of Chinese characters or items in an image, which is not limited herein.

Figures 4, 5:
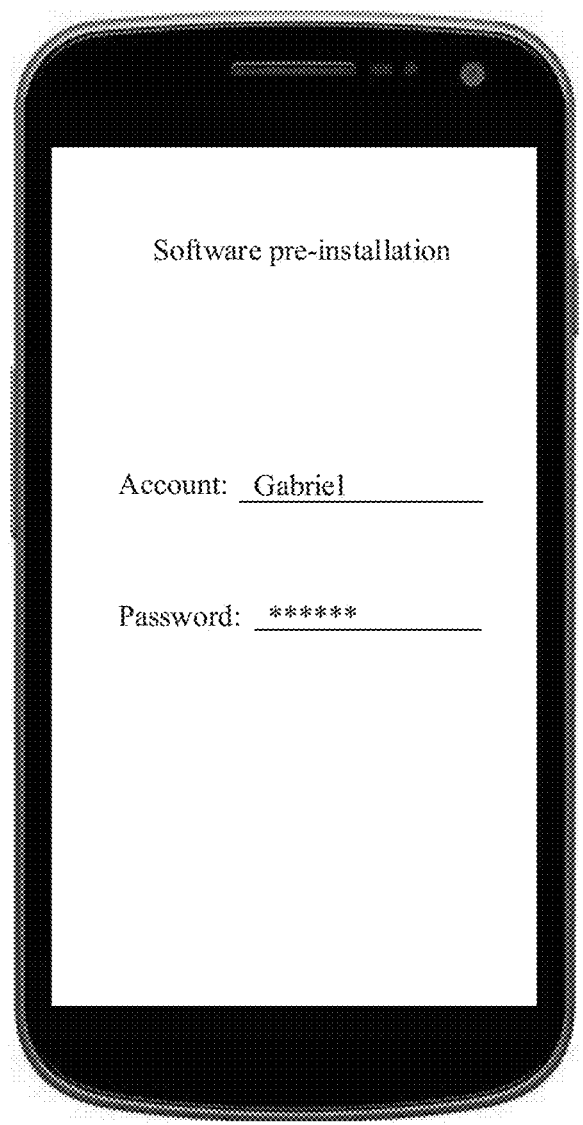

In the implementation of this application, symbol input is used as an example for description. FIG. 4-5 is a schematic diagram of a user-input account and password. A new account of the first user is "Gabriel", and a password is invisible (the password can be set to be visible in some feasible implementations, which is not limited herein).

In an implementation of this application, the device sends the account information to the server, so that the server performs user authentication based on the account information. If the user authentication succeeds, the device receives an authentication success message sent by the server, and the device logs in to the associated account on the server based on the authentication success message. It should be noted that the associated account may be registered by the user on the device, or may be registered on another device, which is not limited herein. The associated account can be logged in on any intelligent device with corresponding software and hardware capabilities; to be specific, the associated account may have been logged in on a plurality of devices, which is not limited herein.

Figures 4, 5, 6:
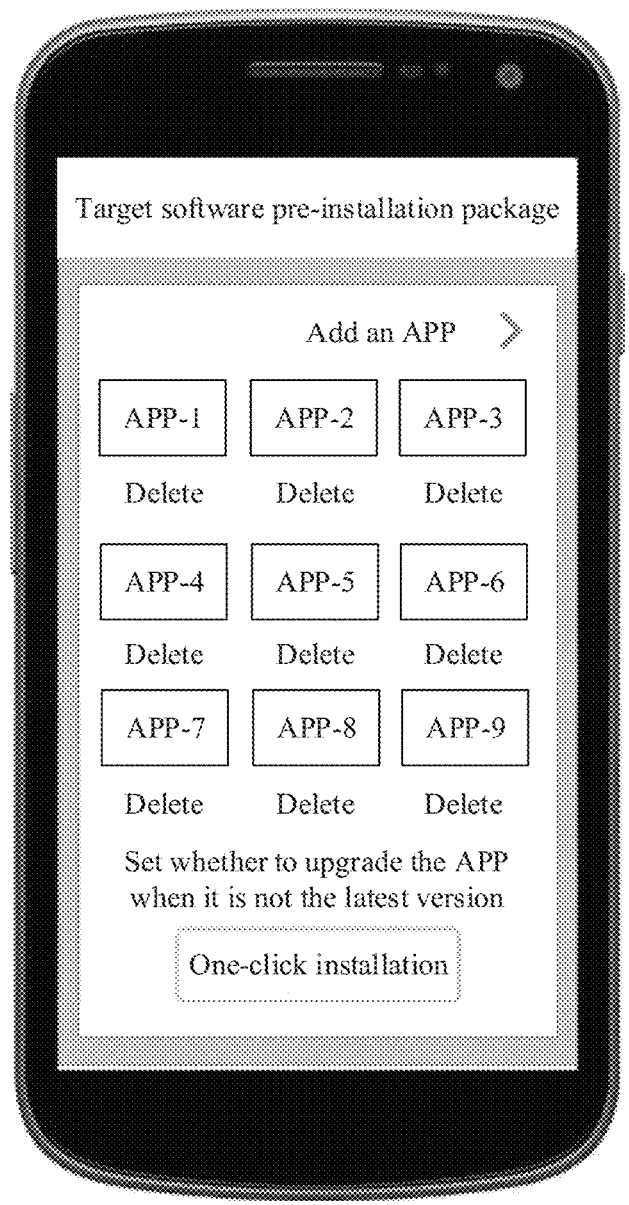

In the implementation of this application, when the device accesses the server by logging in to the associated account, as shown in FIG. 4-4, the user can tap "My Software Pre-installation Package", and the device can display the to-be-installed application set corresponding to the associated account, as shown in FIG. 4-6 (which is a schematic diagram of displaying a to-be-installed application set of an associated account by a device). The to-be-installed application set includes N pieces of application software, any one of the N pieces of application software is application software that has been installed and/or was previously installed in the another device, where N is a positive integer, such as 9, which are APP-1, APP-2, APP-3, APP-4, APP-5, APP-6, APP-7, APP-8, and APP-9 respectively, and the another device is any device that has used or is using the associated account.

After the device accesses the server by logging in to the associated account, the server can obtain the third application software on the device and add the third application software to the to-be-installed application set. Therefore, when another device is used to access the server by logging in to the associated account, the application software indicated by the to-be-installed application set can also be installed, so that when the user loses the device, there is no need to reinstall the application software one by one. Instead, the user can access the server by logging in to the associated account, so as to install the application software indicated by the to-be-installed application set, facilitating the operation of the user. In addition, due to confidential treatment, another user is prevented from using or tampering with the to-be-installed application set.

402. The device receives an editing operation of the user for a to-be-installed application set in the server.

In embodiments of this application, the editing operation includes an application deletion operation and/or an application adding operation. In some feasible embodiments, the editing operation may be screen tapping, voice control, or another device control manner, which is not limited herein. The following uses screen tapping as an example for description. In some feasible embodiments, the device displays a deletion key corresponding to any one of the N application software identifiers, and the application deletion operation may be that the user taps the deletion key corresponding to any one of the N application software identifiers. In some feasible embodiments, the device displays an addition key corresponding to any one of application software identifiers on the application store. When the editing operation is the application adding operation, the device may display an application software identifier in the updated to-be-installed application set and a corresponding addition key, and the application adding operation is that the user taps the addition key.

In some feasible embodiments, the device may display at least two panes based on the operation of the user, for example, a first pane and a second pane, as shown in FIG. 4-7 (which is a schematic diagram of performing split-screen display by the device). The first pane is used to display the application software in the updated to-be-installed application set, and the second pane is used to display the first application software identifier and the key for restoring the first software application identifier.

403. The device sends an editing instruction for the to-be-installed application set to the server based on the editing operation.

404. The server adds an application software identifier to the to-be-installed application set and/or deletes an application software identifier from the to-be-installed application set based on the editing instruction, so as to obtain an updated to-be-installed application set.

In some feasible embodiments, when the editing operation is the application deletion operation, the server deletes a first application software identifier belonging to the to-be-installed application set from the to-be-installed application set based on the editing instruction, so that the server obtains the updated to-be-installed application set. The updated to-be-installed application set does not include the first application software identifier. As shown in FIG. 4-7, if the deletion operation is performed on application software in the to-be-installed application set, for example, three pieces of application software, which are APP-2, APP-5, and APP-8, the remaining application software is APP-1, APP-3, APP-4, APP-6, APP-7, and APP-9. In some feasible implementations, the deleted application software can be uniformly displayed in the first pane, for example, APP-2, APP-5, and APP-8 shown in FIG. 4-7.

In some feasible embodiments, when the editing operation is the application adding operation, the server adds a second application software identifier not belonging to the to-be-installed application set to the to-be-installed application set based on the editing instruction, so that the server obtains the updated to-be-installed application set. The updated to-be-installed application set includes the second application software identifier. If the adding operation is performed on application software in the to-be-installed application set, for example, two pieces of application software, which are APP-A and APP-B, the obtained application software is APP-1, APP-2. APP-3, APP-4, APP-5, APP-6, APP-7, APP-8, APP-9. APP-A, and APP-B.

In some feasible embodiments, the editing operation may include both the application deletion operation and the application adding operation, which is not limited herein. In the implementation of this application, after the application software is deleted, the remaining application software in the to-be-installed application set is shown in FIG. 4-8 (which is a schematic diagram of updating a to-be-installed application set by a device). In this case, the to-be-installed application set can be updated so that the to-be-installed application set does not include the deleted application software. To be specific, APP-1, APP-3, APP-4, APP-6, APP-7, and APP-9 are displayed, and APP-2, APP-5, and APP-8 are not displayed.

Because the user can delete the application software in the to-be-installed application set, when the installation is performed, unnecessary or unwanted application software is not installed, instead of installing application software and then deleting it one by one. This reduces operation steps, facilitating the operation of the user. Because the user can add application software to the to-be-installed application set based on personal needs, the personalized software application installation needs of the user are met.

405. The device receives the installation operation of the user for the application software indicated by the updated to-be-installed application set.

In the implementation of this application, after the unnecessary application software is deleted, the remaining application software can be installed in batches, and the device can display a batch installation key, as shown in FIG. 4-9, which is a schematic diagram of batch installation of a to-be-installed application set. The application software (such as APP-1, APP-3, and APP-4) that has not been installed is installed. The application software (such as APP-5, APP-6, and APP-7) that has been installed is not installed and "installed" may be displayed. The user can perform the installation operation: the user taps the batch installation key.

Because the user can delete the application software in the to-be-installed application set, when the installation is performed, unnecessary or unwanted application software is not installed, instead of installing application software and then deleting it one by one. This reduces operation steps, facilitating the operation of the user. Because the user can add application software to the to-be-installed application set based on personal needs, the personalized software application installation needs of the user are met.

406. The device determines application software that has not been installed in the device among the application software indicated by the updated to-be-installed application set, and installs the application software that has not been installed.

It should be noted that, in some feasible implementations, if the first application software has not been installed in the device, the device installs the first application software, as shown in FIG. 4-9, and the first application software may be APP-1, APP-3, and APP-4. In some feasible embodiments, the installation package for the first application software can be downloaded through the server and installed, or can be downloaded through another application store and installed, which is not limited herein.

Because the device may have one or more pieces of application software in the updated to-be-installed application set, installing only the application software that has not been installed in the device can pertinently meet the needs of the user without repeated installation, thereby reducing computing resources and bandwidth resources.

407. The device determines application software that has been installed in the device among the application software indicated by the updated to-be-installed application set.

408. The device determines application software not of a currently latest version among the application software that has been installed.

In some feasible embodiments, whether a version of the installed application software is latest can be detected. In some feasible embodiments, the currently latest version of the same application software can be detected by visiting the application store. If it is detected that the version of the installed application software is latest, no processing is required. If the version of the installed application software is not latest, the installed application software can be upgraded to the currently latest version. For example, if the currently latest version of WeChat is 6.5, and WeChat on the device is WeChat 6.4, an installation package of WeChat 6.4 can be downloaded and installed, so that WeChat is upgraded to the latest version WeChat 6.5. If WeChat on the device is WeChat 6.5, no processing is required.

409. The device receives the upgrade operation of the user for the application software not of a currently latest version.

410. The device upgrades the application software not of a currently latest version to the currently latest version.

In some feasible implementations, if the first application software has been installed in the device but its version is not latest, the user can determine whether to perform upgrade, because the upgrade may cause load of computing resources to the operation of the mobile phone. As shown in FIG. 4-10 (which is a schematic diagram of an upgrade dialog box), APP-5 and APP-9 have been installed, but their versions are not the latest. The device can display an upgrade prompt for application software indicated by any application software identifier in the application set whose version is not latest. The upgrade prompt includes a confirmation key and a cancellation key. When the user taps the confirmation key, the step of upgrading the first application software to the latest version by the device is performed. When the user taps the cancellation key, the step of upgrading the first application software to the latest version by the device is not performed. FIG. 4-11 is a schematic diagram of upgrading first application software.

The version of the installed application software among the application software indicated by the updated to-be-installed application set may not be currently latest, and may be upgraded to the currently latest version, so that the user does not need to upgrade the application software one by one. This facilitates the operation of the user. In some scenarios, for example, device memory is insufficient or traffic is charged, the user may temporarily not upgrade the currently in-service application software not of a currently latest version to the currently latest version based on the foregoing operation. The user can determine, based on a definite operation, whether to upgrade the application software not of a currently latest version.

411. If third application software not belonging to the to-be-installed application set has been installed in the device, the device sends an adding operation for a third application software identifier to the server, where the third application software identifier indicates the third application software.

412. The server adds the third application software identifier to the to-be-installed application set based on the adding operation.

It should be noted that, when another device accesses the server to use the software pre-installation package service, the server can learn the application software installed locally on the another device. In some feasible implementations, if it is learned that third application software not belonging to the to-be-installed application set has been installed in the another device, the device sends an adding operation for a third application software identifier to the server. The third application software identifier indicates the third application software, so that the server adds the third application software identifier to the to-be-installed application set based on the adding operation. In this way, when the user logs in to the associated account through another device to access the server, the to-be-installed application set that includes the third application software identifier can be obtained, and the functions described in the embodiments of this application can be implemented.

If a plurality of devices have used the associated account to receive the software pre-installation package service provided by the server, the server can learn of the application software that is installed or was previously installed on any one of the plurality of devices. If the another device deletes some application software, the server can delete the application software from the to-be-installed application set, or may retain the application software, which is not limited herein. In some feasible implementations, when the user uses the device, the third application software is downloaded and installed, such as APP-10 shown in FIG. 4-13 (which is a schematic diagram of a device on which third application software has been installed). The third application software is application software that is not included in the current to-be-installed application set. In this case, the device can upload information about the third application software to the server, so as to update the to-be-installed application set. In some feasible implementations, after receiving the information about the third application software uploaded by the device, the server can update the to-be-installed application set, as shown in FIG. 4-14 (which is a schematic diagram of an updated to-be-installed application set), and the to-be-installed application set includes the third application software (such as APP-10).

After the device accesses the server by logging in to the associated account, the server can obtain the third application software on the device and add the third application software to the to-be-installed application set. Therefore, when another device is used to access the server by logging in to the associated account, the application software indicated by the to-be-installed application set can also be installed, so that when the user loses the device, there is no need to reinstall the application software one by one. Instead, the user can access the server by logging in to the associated account, so as to install the application software indicated by the to-be-installed application set, facilitating the operation of the user. In addition, due to confidential treatment, another user is prevented from using or tampering with the to-be-installed application set.

413. The device receives the restoration operation of the user for the first application software identifier.

414. The device sends a restoration instruction for the first application software identifier to the server based on the restoration operation.

415. The server restores the first application software identifier in the updated to-be-installed application set based on the restoration instruction, so that the updated to-be-installed application set includes the first application software identifier.

In some feasible implementations, the user may further perform a restoration operation on the deleted application software. Specifically, the device displays a restoration key corresponding to the first application software identifier, and the restoration operation includes: the user taps the restoration key. As shown in FIG. 4-12 (which is a schematic diagram of performing a restoration operation on deleted application software by a user), the user taps the addition key corresponding to the deleted application software (for example, two pieces, which are APP-2 and APP-5). In this case, the corresponding application software can be placed in the to-be-installed application set for restoration, so that the to-be-installed application set includes APP-2 and APP-5, and the deleted application software is only APP-8.

In some scenarios, if the user deletes the first application software identifier by mistake, or when the user needs the application software indicated by the first application software identifier again, the application software can be restored based on the restoration operation. Through the split-screen display, the user does not need to switch the operation interface when performing a deletion operation or an adding operation, facilitating the operation of the user.

The method part is described above, and the functional apparatus part is described below. FIG. 5 shows an application software installation device 500, including:

a communications port 501, an interaction module 502, and at least one processor 503; the communications port 501 is configured to access a server; the interaction module 502 is configured to receive an editing operation of the user for a to-be-installed application set in the server, where the to-be-installed application set includes N application software identifiers, N is a positive integer, the N application software identifiers are used to indicate corresponding to-be-installed application software, and the to-be-installed application software is application software backed up by another device on the server.

The at least one processor 503 is configured to perform the following steps:

generating an editing instruction for the to-be-installed application set based on the editing operation. The editing instruction is used to instruct to add an application software identifier to the to-be-installed application set and/or delete an application software identifier from the to-be-installed application set. The communications port is further configured to send the editing instruction to the server, so that the server adds an application software identifier to the to-be-installed application set and/or deletes an application software identifier from the to-be-installed application set based on the editing instruction, so as to obtain an updated to-be-installed application set.

The user can use the device to perform the editing operation on the to-be-installed application set in the server, so as to add an application software identifier to the to-be-installed application set and/or delete an application software identifier from the to-be-installed application set. The to-be-installed application set includes N application software identifiers, and the N application software identifiers are used to indicate corresponding to-be-installed application software. The to-be-installed application software is application software backed up by another device on the server. Therefore, in comparison with the case in which only a default to-be-installed application set can be installed, in this application, the to-be-installed application set required by the user can be personalized to meet the personalized software application installation needs of the user.

In some feasible embodiments, after the step of sending the editing instruction for the to-be-installed application set to the server based on the editing operation, the interaction module 502 is further configured to receive the installation operation of the user for application software indicated by the updated to-be-installed application set.

The at least one processor 503 is configured to install the application software indicated by the updated to-be-installed application set.

The user can install the application software indicated by the updated to-be-installed application set on the device, and the updated to-be-installed application set is obtained by performing the editing operation on the to-be-installed application set. Therefore, in comparison with the case in which only a default to-be-installed application set can be installed, in this application, the to-be-installed application set required by the user can be personalized to meet the personalized software application installation needs of the user.

In some feasible embodiments, in the step of installing the application software indicated by the updated to-be-installed application set, the at least one processor 503 is further configured to perform the following steps:

determining application software that has not been installed in the device among the application software indicated by the updated to-be-installed application set; and installing the application software that has not been installed. Because the device may have one or more pieces of application software in the updated to-be-installed application set, installing only the application software that has not been installed in the device can pertinently meet the needs of the user without repeated installation, thereby reducing computing resources and bandwidth resources.

In some feasible embodiments, in the step of installing the application software indicated by the updated to-be-installed application set, the at least one processor 503 is further configured to perform the following steps:

determining application software that has been installed in the device among the application software indicated by the updated to-be-installed application set; determining application software not of a currently latest version among the application software that has been installed; and upgrading the application software not of a currently latest version to the currently latest version.

The version of the installed application software among the application software indicated by the updated to-be-installed application set may not be currently latest, and may be upgraded to the currently latest version, so that the user does not need to upgrade the application software one by one. This facilitates the operation of the user.

In some feasible embodiments, before the step of upgrading the application software not of a currently latest version to the currently latest version, the interaction module 502 is further configured to receive the upgrade operation of the user for the application software not of a currently latest version;

the at least one processor 503 is further configured to perform the step of upgrading the application software not of a currently latest version to the currently latest version based on the upgrade operation.

In some scenarios, for example, device memory is insufficient or traffic is charged, the user may temporarily not upgrade the currently in-service application software not of a currently latest version to the currently latest version based on the foregoing operation.

In some feasible embodiments, the editing operation includes an application deletion operation and/or an application adding operation. When the editing operation is the application deletion operation, the editing instruction is used to instruct the server to delete a first application software identifier belonging to the to-be-installed application set from the to-be-installed application set, so that the server obtains the updated to-be-installed application set. The updated to-be-installed application set does not include the first application software identifier. In addition/Alternatively, when the editing operation is the application adding operation, the editing instruction is used to instruct the server to add a second application software identifier not belonging to the to-be-installed application set to the to-be-installed application set, so that the server obtains the updated to-be-installed application set. The updated to-be-installed application set includes the second application software identifier.

Because the user can delete the application software in the to-be-installed application set, when the installation is performed, unnecessary or unwanted application software is not installed, instead of installing application software and then deleting it one by one. This reduces operation steps, facilitating the operation of the user. Because the user can add application software to the to-be-installed application set based on personal needs, the personalized software application installation needs of the user are met.

In some feasible embodiments, the interaction module 502 is configured to receive the restoration operation of the user for the first application software identifier:

the communications port 501 is further configured to send a restoration instruction for the first application software identifier to the server based on the restoration operation; the restoration instruction is used to instruct the server to restore the first application software identifier in the updated to-be-installed application set, so that the updated to-be-installed application set includes the first application software identifier.

In some scenarios, if the user deletes the first application software identifier by mistake, or when the user needs the application software indicated by the first application software identifier again, the application software can be restored based on the restoration operation.

In some feasible embodiments, before the step of receiving the restoration operation of the user for the first application software identifier, the interaction module is further configured to display a first pane and a second pane based on the operation of the user, where the first pane is used to display the application software in the updated to-be-installed application set, and the second pane is used to display the first application software identifier and the key for restoring the first software application identifier.

Through the split-screen display, the user does not need to switch the operation interface when performing a deletion operation or an adding operation, facilitating the operation of the user.

In some feasible embodiments, in the step of accessing the server, the communications port is further configured to access the server by the device by logging in to an associated account, where the associated account corresponds to the to-be-installed application set.

In some feasible embodiments, after the step of accessing the server by logging in to the associated account, the communications port is further configured to: if third application software not belonging to the to-be-installed application set has been installed in the device, send an adding operation for a third application software identifier to the server. The third application software identifier indicates the third application software, so that the server adds the third application software identifier to the to-be-installed application set based on the adding operation.

After the device accesses the server by logging in to the associated account, the server can obtain the third application software on the device and add the third application software to the to-be-installed application set. Therefore, when another device is used to access the server by logging in to the associated account, the application software indicated by the to-be-installed application set can also be installed, so that when the user loses the device, there is no need to reinstall the application software one by one. Instead, the user can access the server by logging in to the associated account, so as to install the application software indicated by the to-be-installed application set, facilitating the operation of the user.

FIG. 6 shows an application software installation server 600, including:

a communications port 601 and at least one processor 602. The communications port 601 is configured to access a device. The communications port 601 is further configured to receive an editing instruction for a to-be-installed application set from the device. The to-be-installed application set includes N application software identifiers, where N is a positive integer, and the N application software identifiers are used to indicate corresponding to-be-installed application software. The to-be-installed application software is application software backed up by another device on the server. The at least one processor 602 is configured to perform the following step:

adding an application software identifier to the to-be-installed application set and/or deleting an application software identifier from the to-be-installed application set based on the editing instruction, so as to obtain an updated to-be-installed application set.

The user can use the device to perform the editing operation on the to-be-installed application set in the server, so as to add an application software identifier to the to-be-installed application set and/or delete an application software identifier from the to-be-installed application set. The to-be-installed application set includes N application software identifiers, and the N application software identifiers are used to indicate corresponding to-be-installed application software. The to-be-installed application software is application software backed up by another device on the server. Therefore, in comparison with the case in which only a default to-be-installed application set can be installed, in this application, the to-be-installed application set required by the user can be personalized to meet the personalized software application installation needs of the user.

In some feasible embodiments, the editing operation includes an application deletion operation and/or an application adding operation. When the editing operation is the application deletion operation, the server deletes a first application software identifier belonging to the to-be-installed application set from the to-be-installed application set based on the editing instruction, so as to obtain the updated to-be-installed application set. The updated to-be-installed application set does not include the first application software identifier. In addition/Alternatively, when the editing operation is the application adding operation, the server adds a second application software identifier not belonging to the to-be-installed application set to the to-be-installed application set based on the editing instruction, so as to obtain the updated to-be-installed application set. The updated to-be-installed application set includes the second application software identifier.

Because the user can delete the application software in the to-be-installed application set, when the installation is performed, unnecessary or unwanted application software is not installed, instead of installing application software and then deleting it one by one. This reduces operation steps, facilitating the operation of the user. Because the user can add application software to the to-be-installed application set based on personal needs, the personalized software application installation needs of the user are met.

In some feasible embodiments, when the editing operation is the application deletion operation, after the step of deleting, by the server, the first application software identifier belonging to the to-be-installed application set from the to-be-installed application set based on the editing instruction, the communications port is configured to receive a restoration instruction that is for the first application software identifier and that is sent by the device;

the at least one processor 602 is further configured to restore the first application software identifier in the updated to-be-installed application set based on the restoration instruction, so that the updated to-be-installed application set includes the first application software identifier.

In some scenarios, if the user deletes the first application software identifier by mistake, or when the user needs the application software indicated by the first application software identifier again, the application software can be restored based on the restoration operation.

In some feasible embodiments, in the step of accessing the device, the communications port 601 is further configured to accept access of the device performed by logging in to an associated account, where the associated account corresponds to the to-be-installed application set.

In some feasible embodiments, after the step of accepting the access of the device performed by logging in to the associated account, the communications port is further configured to: if third application software not belonging to the to-be-installed application set has been installed in the device, receive an adding operation that is for a third application software identifier and that is sent by the device. The third application software identifier is used to indicate the third application software;

the at least one processor 602 is further configured to add the third application software identifier to the to-be-installed application set based on the adding operation.

After the device accesses the server by logging in to the associated account, the server can obtain the third application software on the device and add the third application software to the to-be-installed application set. Therefore, when another device is used to access the server by logging in to the associated account, the application software indicated by the to-be-installed application set can also be installed, so that when the user loses the device, there is no need to reinstall the application software one by one. Instead, the user can access the server by logging in to the associated account, so as to install the application software indicated by the to-be-installed application set, facilitating the operation of the user.

Figures 4, 5, 6, 7:
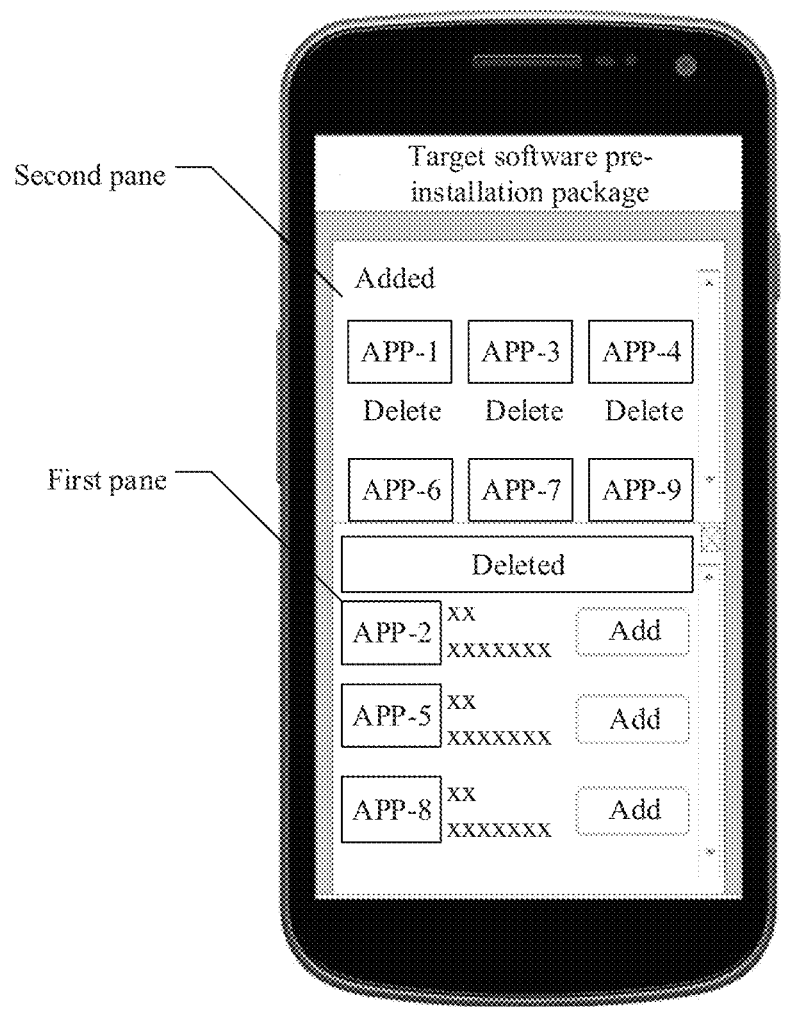

FIG. 7 shows an application software installation device 700, including:

a communications module 701, configured to access a server; and an interaction module 702, configured to receive an editing operation of a user for a to-be-installed application set in the server. The to-be-installed application set includes N application software identifiers, where N is a positive integer, and the N application software identifiers are used to indicate corresponding to-be-installed application software. The to-be-installed application software is application software backed up by another device on the server. The communications module 701 is further configured to send an editing instruction for the to-be-installed application set to the server based on the editing operation. The editing instruction is used to instruct the server to add an application software identifier to the to-be-installed application set and/or delete an application software identifier from the to-be-installed application set, so that the server obtains an updated to-be-installed application set.

The user can use the device to perform the editing operation on the to-be-installed application set in the server, so as to add an application software identifier to the to-be-installed application set and/or delete an application software identifier from the to-be-installed application set. The to-be-installed application set includes N application software identifiers, and the N application software identifiers are used to indicate corresponding to-be-installed application software. The to-be-installed application software is application software backed up by another device on the server. Therefore, in comparison with the case in which only a default to-be-installed application set can be installed, in this application, the to-be-installed application set required by the user can be personalized to meet the personalized software application installation needs of the user.

In some feasible embodiments, the interaction module 702 is further configured to receive the installation operation of the user for application software indicated by the updated to-be-installed application set; in some feasible embodiments, a processing module 703 is configured to install the application software indicated by the updated to-be-installed application set.

The user can install the application software indicated by the updated to-be-installed application set on the device, and the updated to-be-installed application set is obtained by performing the editing operation on the to-be-installed application set. Therefore, in comparison with the case in which only a default to-be-installed application set can be installed, in this application, the to-be-installed application set required by the user can be personalized to meet the personalized software application installation needs of the user.

Figures 4, 5, 6, 7, 8:
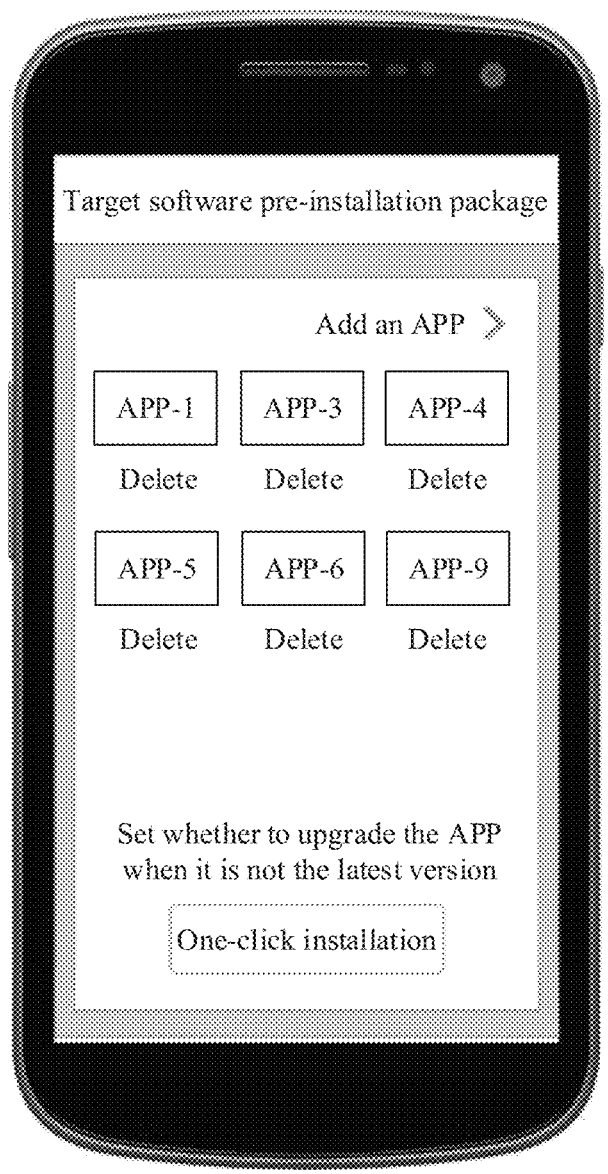

In some feasible embodiments, FIG. 8 is a schematic diagram of another embodiment of an application software installation device 700; the processing module 703 includes:

a determining submodule 7031, configured to determine application software that has not been installed in the device among the application software indicated by the updated to-be-installed application set; and an installation submodule 7032, configured to install the application software that has not been installed.

Because the device may have one or more pieces of application software in the updated to-be-installed application set, installing only the application software that has not been installed in the device can pertinently meet the needs of the user without repeated installation, thereby reducing computing resources and bandwidth resources.

In some feasible embodiments, the installation submodule 7031 is specifically configured to:

determine application software that has been installed in the device among the application software indicated by the updated to-be-installed application set; determine application software not of a currently latest version among the application software that has been installed; and upgrade the application software not of a currently latest version to the currently latest version.

The version of the installed application software among the application software indicated by the updated to-be-installed application set may not be currently latest, and may be upgraded to the currently latest version, so that the user does not need to upgrade the application software one by one. This facilitates the operation of the user.

In some feasible embodiments, the installation submodule 7031 is specifically further configured to:

receive the upgrade operation of the user for the application software not of a currently latest version; perform the step of upgrading the application software not of a currently latest version to the currently latest version based on the upgrade operation.

In some scenarios, for example, device memory is insufficient or traffic is charged, the user may temporarily not upgrade the currently in-service application software not of a currently latest version to the currently latest version based on the foregoing operation.

In some feasible embodiments, the editing operation includes an application deletion operation and/or an application adding operation. When the editing operation is the application deletion operation, the editing instruction is used to instruct the server to delete a first application software identifier belonging to the to-be-installed application set from the to-be-installed application set, so that the server obtains the updated to-be-installed application set. The updated to-be-installed application set does not include the first application software identifier. In addition/Alternatively, when the editing operation is the application adding operation, the editing instruction is used to instruct the server to add a second application software identifier not belonging to the to-be-installed application set to the to-be-installed application set, so that the server obtains the updated to-be-installed application set. The updated to-be-installed application set includes the second application software identifier.

Because the user can delete the application software in the to-be-installed application set, when the installation is performed, unnecessary or unwanted application software is not installed, instead of installing application software and then deleting it one by one. This reduces operation steps, facilitating the operation of the user. Because the user can add application software to the to-be-installed application set based on personal needs, the personalized software application installation needs of the user are met.

In some feasible embodiments, the communications module 701 is specifically configured to:

receive the restoration operation of the user for the first application software identifier; and send a restoration instruction for the first application software identifier to the server based on the restoration operation; the restoration instruction is used to instruct the server to restore the first application software identifier in the updated to-be-installed application set, so that the updated to-be-installed application set includes the first application software identifier.

In some scenarios, if the user deletes the first application software identifier by mistake, or when the user needs the application software indicated by the first application software identifier again, the application software can be restored based on the restoration operation.

In some feasible embodiments, the interaction module 702 is specifically further configured to:

display a first pane and a second pane based on the operation of the user, where the first pane is used to display the application software in the updated to-be-installed application set, and the second pane is used to display the first application software identifier and the key for restoring the first software application identifier. Through the split-screen display, the user does not need to switch the operation interface when performing a deletion operation or an adding operation, facilitating the operation of the user.

In some feasible embodiments, the communications module 701 is specifically further configured to: access the server by logging in to an associated account, where the associated account corresponds to the to-be-installed application set.

In some feasible embodiments, the communications module 701 is specifically further configured to: if third application software not belonging to the to-be-installed application set has been installed in the device, send an adding operation for a third application software identifier to the server. The third application software identifier indicates the third application software, so that the server adds the third application software identifier to the to-be-installed application set based on the adding operation.

After the device accesses the server by logging in to the associated account, the server can obtain the third application software on the device and add the third application software to the to-be-installed application set. Therefore, when another device is used to access the server by logging in to the associated account, the application software indicated by the to-be-installed application set can also be installed, so that when the user loses the device, there is no need to reinstall the application software one by one.

Instead, the user can access the server by logging in to the associated account, so as to install the application software indicated by the to-be-installed application set, facilitating the operation of the user.

Figures 4, 5, 6, 7, 8, 9:
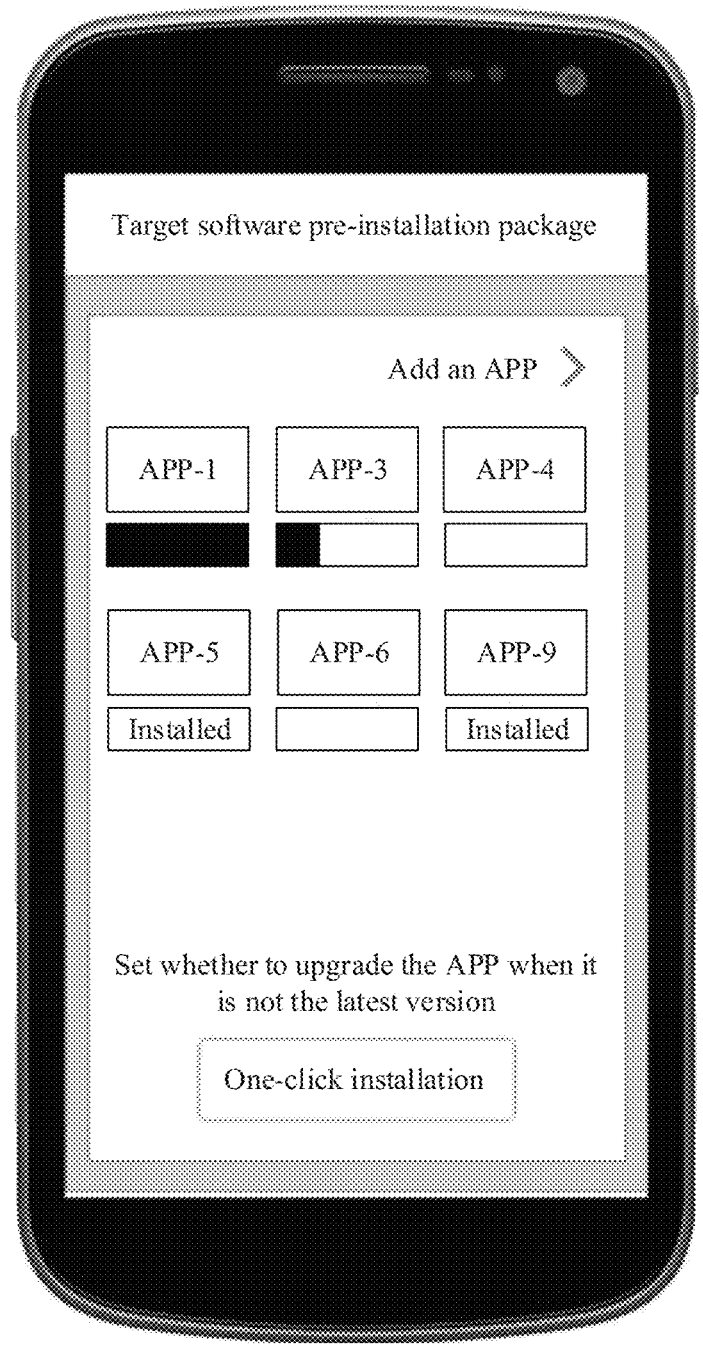
Figures 4, 5, 6, 7, 8, 9, 10:
Figures 4, 5, 6, 7, 8, 9, 10, 11:
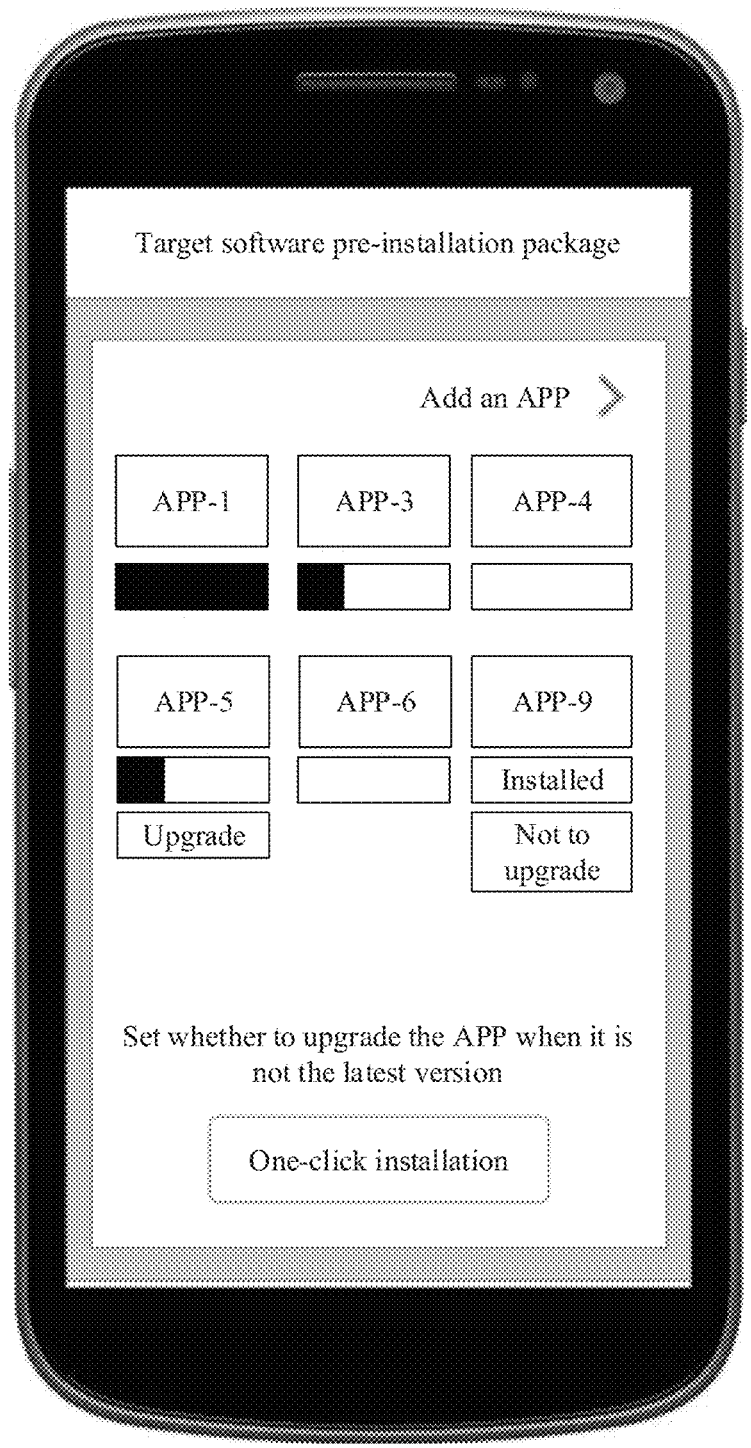
Figures 4, 5, 6, 7, 8, 9, 10, 11, 12:
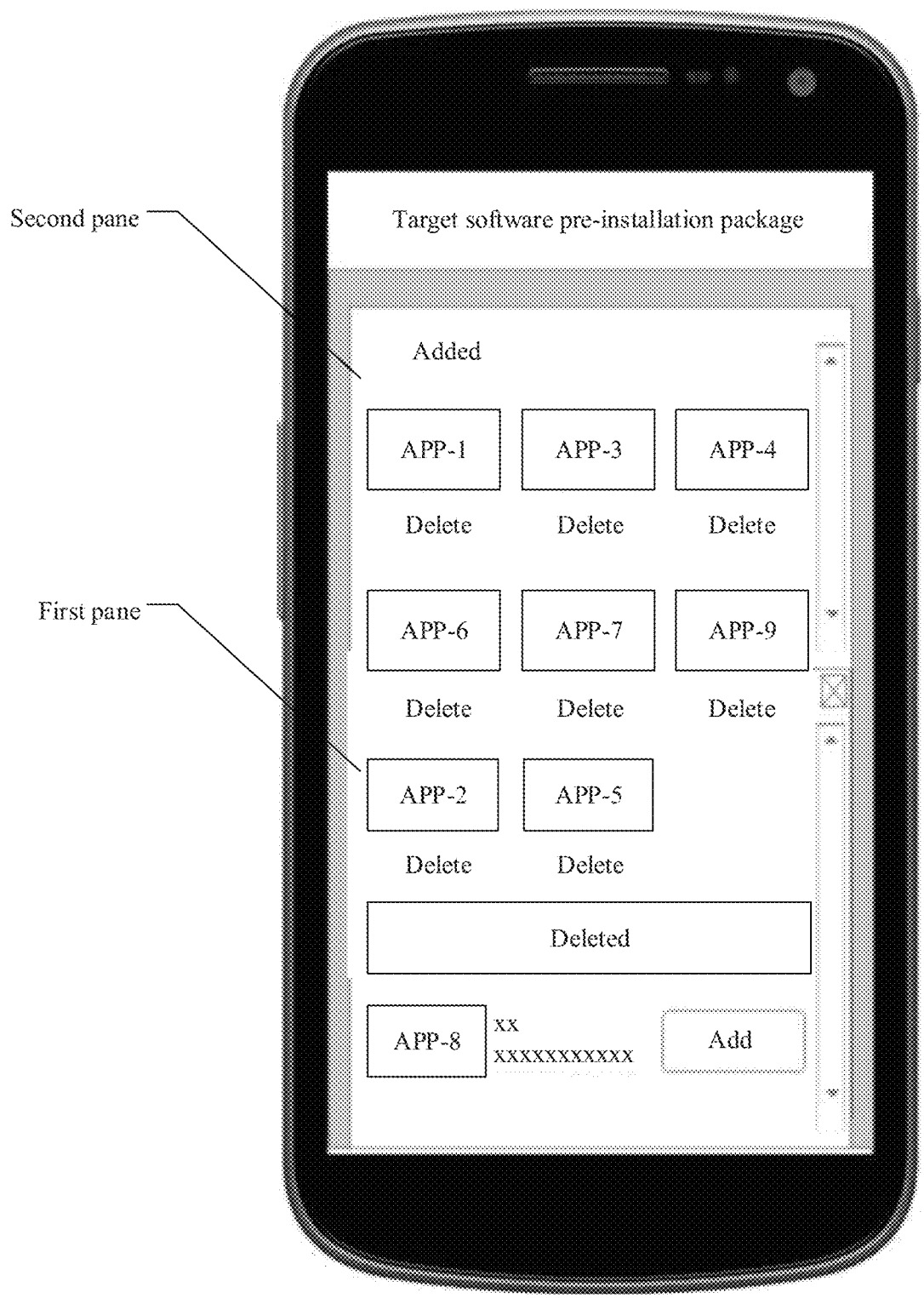
Figures 4, 5, 6, 7, 8, 9, 10, 11, 12, 13:
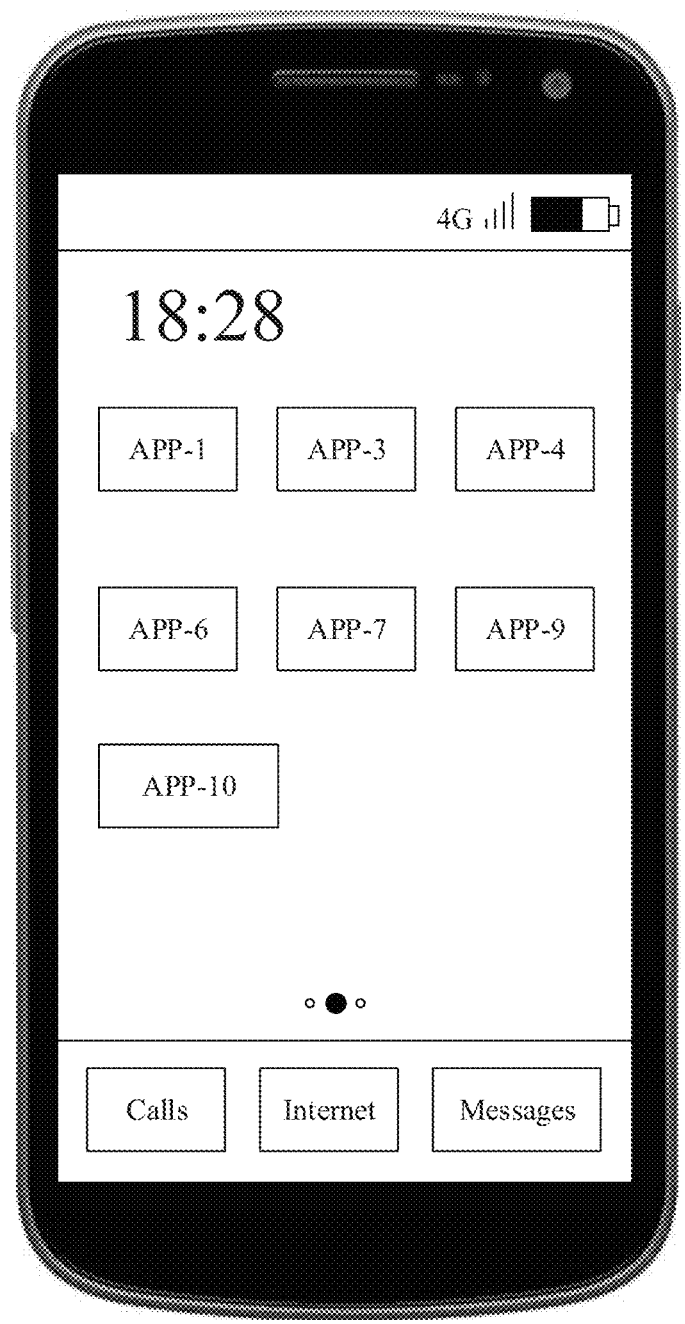
Figures 4, 5, 6, 7, 8, 9, 10, 11, 12, 13, 14:
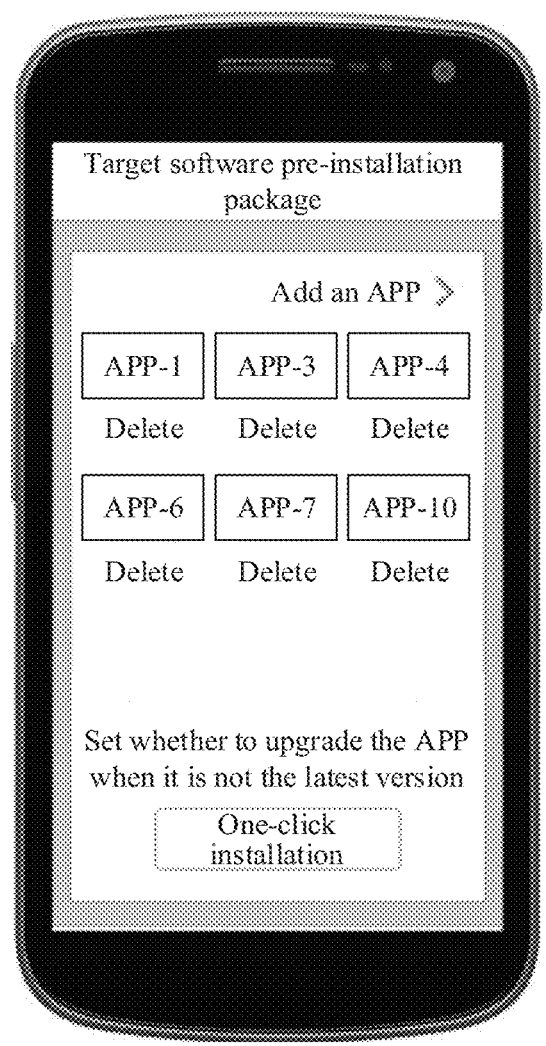
Figure 5:
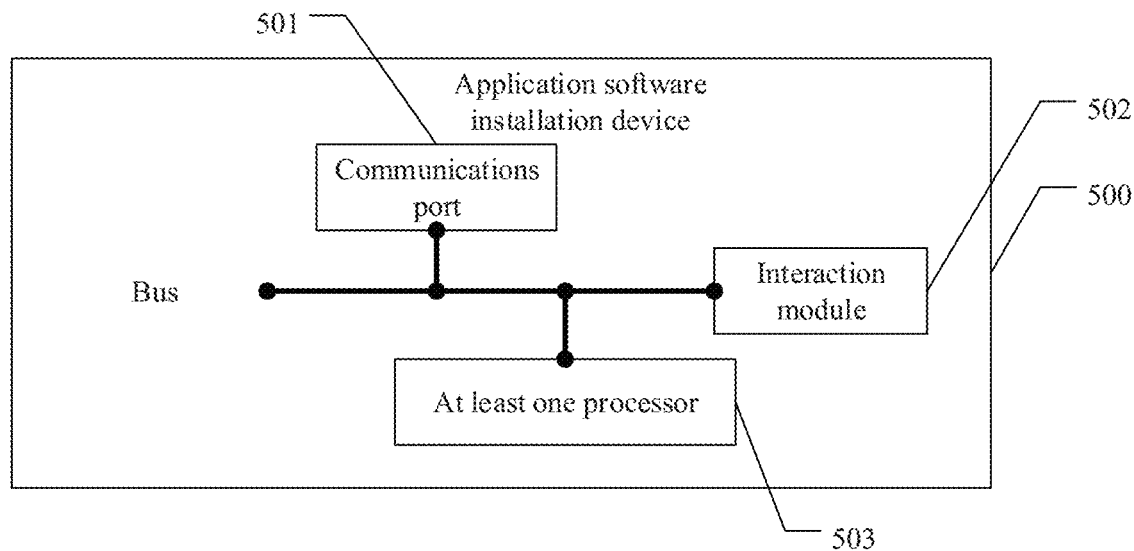
Figure 6:
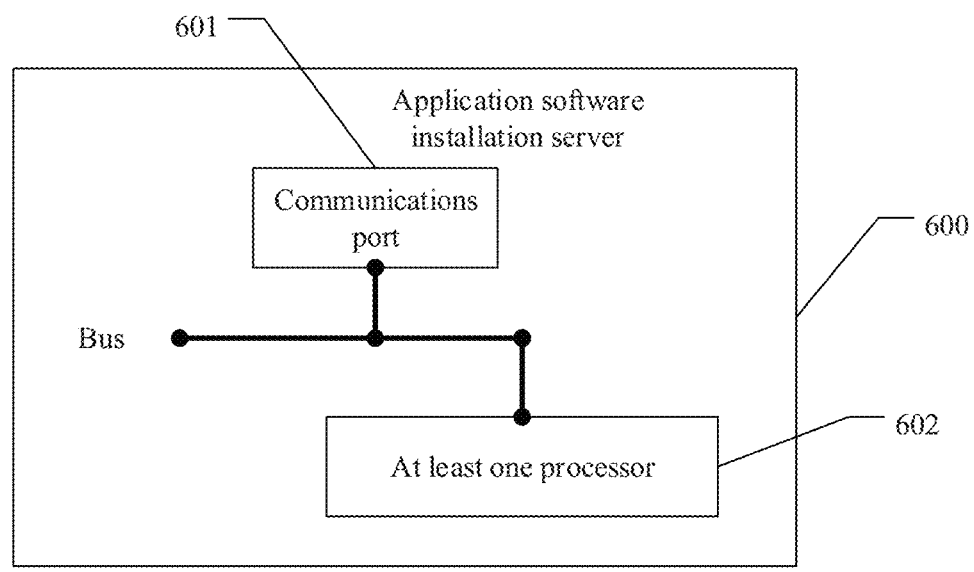
Figure 7:
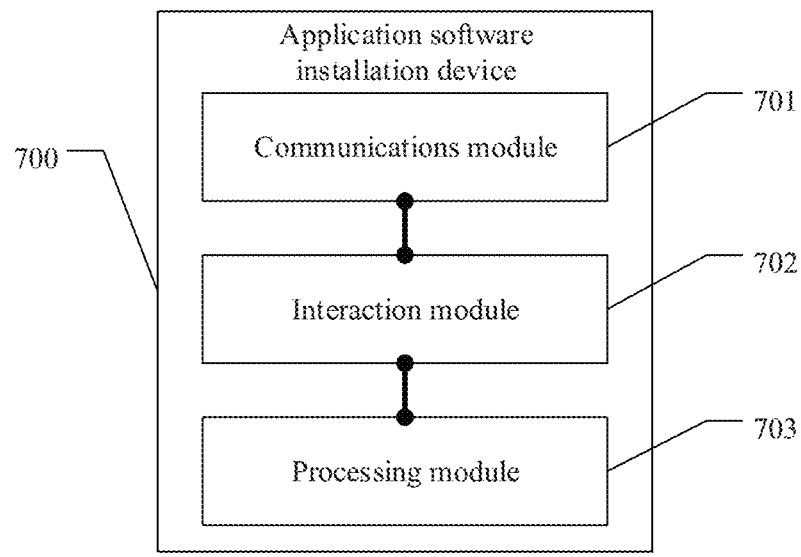
Figure 8:
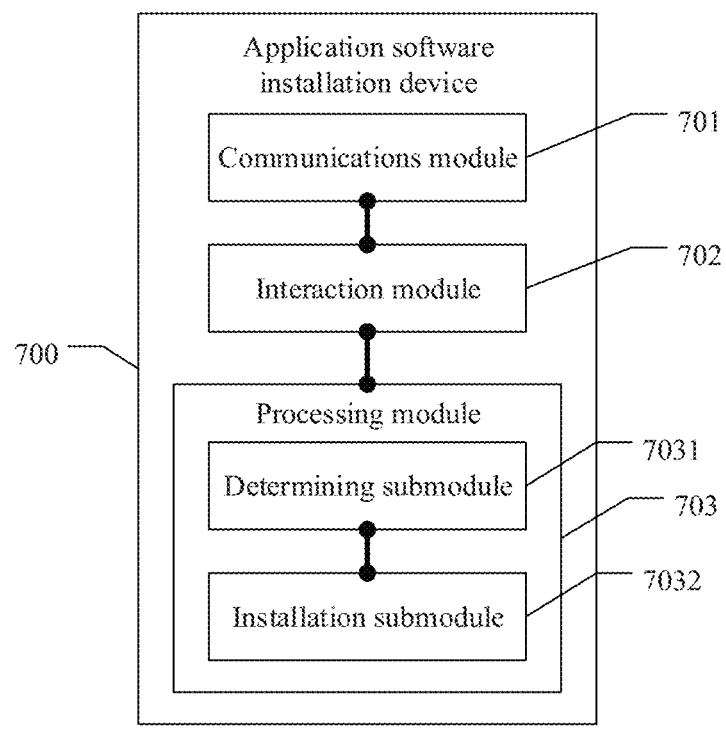
Figure 9:
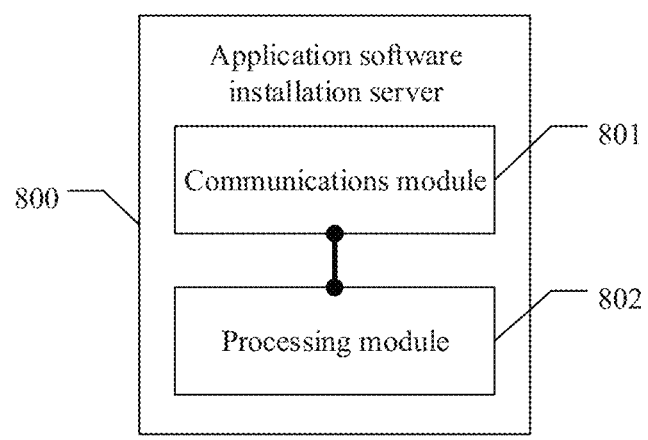

FIG. 9 shows an application software installation server 800, including:

a communications module 801, configured to access a device, where the communications module 801 is further configured to receive an editing instruction for a to-be-installed application set from the device; the to-be-installed application set includes N application software identifiers, where N is a positive integer, and the N application software identifiers are used to indicate corresponding to-be-installed application software; the to-be-installed application software is application software backed up by another device on the server; and a processing module 802, configured to add an application software identifier to the to-be-installed application set and/or delete an application software identifier from the to-be-installed application set based on the editing instruction, so as to obtain an updated to-be-installed application set.

The user can use the device to perform the editing operation on the to-be-installed application set in the server, so as to add an application software identifier to the to-be-installed application set and/or delete an application software identifier from the to-be-installed application set. The to-be-installed application set includes N application software identifiers, and the N application software identifiers are used to indicate corresponding to-be-installed application software. The to-be-installed application software is application software backed up by another device on the server. Therefore, in comparison with the case in which only a default to-be-installed application set can be installed, in this application, the to-be-installed application set required by the user can be personalized to meet the personalized software application installation needs of the user.

In some feasible embodiments, the editing operation includes an application deletion operation and/or an application adding operation, and the processing module 802 is specifically configured to:

when the editing operation is the application deletion operation, delete a first application software identifier belonging to the to-be-installed application set from the to-be-installed application set based on the editing instruction, so as to obtain the updated to-be-installed application set, where the updated to-be-installed application set does not include the first application software identifier; and/or when the editing operation is the application adding operation, add a second application software identifier not belonging to the to-be-installed application set to the to-be-installed application set based on the editing instruction, so as to obtain the updated to-be-installed application set, where the updated to-be-installed application set includes the second application software identifier.

Because the user can delete the application software in the to-be-installed application set, when the installation is performed, unnecessary or unwanted application software is not installed, instead of installing application software and then deleting it one by one. This reduces operation steps, facilitating the operation of the user. Because the user can add application software to the to-be-installed application set based on personal needs, the personalized software application installation needs of the user are met.

In some feasible embodiments, when the editing operation is the application deletion operation, the communications module 801 is further configured to:

receive a restoration instruction that is for the first application software identifier and that is sent by the device; and restore the first application software identifier in the updated to-be-installed application set based on the restoration instruction, so that the updated to-be-installed application set includes the first application software identifier. In some scenarios, if the user deletes the first application software identifier by mistake, or when the user needs the application software indicated by the first application software identifier again, the application software can be restored based on the restoration operation.

In some feasible embodiments, the communications module 801 is specifically further configured to accept access of the device performed by logging in to an associated account, where the associated account corresponds to the to-be-installed application set.

In some feasible embodiments, the communications module 801 is further configured to: if third application software not belonging to the to-be-installed application set has been installed in the device, receive an adding operation that is for a third application software identifier and that is sent by the device, where the third application software identifier is used to indicate the third application software; and the processing module 802 is further configured to add the third application software identifier to the to-be-installed application set based on the adding operation.

After the device accesses the server by logging in to the associated account, the server can obtain the third application software on the device and add the third application software to the to-be-installed application set. Therefore, when another device is used to access the server by logging in to the associated account, the application software indicated by the to-be-installed application set can also be installed, so that when the user loses the device, there is no need to reinstall the application software one by one. Instead, the user can access the server by logging in to the associated account, so as to install the application software indicated by the to-be-installed application set, facilitating the operation of the user.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

It may be clearly understood by persons skilled in the art that, for the purpose of convenient and brief description, for a detailed working process of the foregoing system, apparatus, and unit, refer to a corresponding process in the foregoing method implementations, and details are not described herein again.

In the several implementations provided in this application, it should be understood that the disclosed system, apparatus, and method may be implemented in other manners. For example, the described apparatus implementation is merely illustrative. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

The invention claimed is:

1. An application software installation method, implemented by a device, wherein the application software installation method comprises:

displaying an upgrade prompt, wherein the upgrade prompt comprises a confirmation key;

receiving a confirmation key input;

receiving, based on the confirmation key input, an editing operation from a user for a to-be-installed application set, wherein the to-be-installed application set comprises a plurality of application software identifiers, and wherein the application software identifiers correspond to to-be-installed application software from another device;

sending an editing instruction for the to-be-installed application set based on the editing operation, wherein the editing instruction instructs to either add a first application software identifier to the to-be-installed application set or delete a second application software identifier from the to-be-installed application set to obtain an updated to-be-installed application set; and displaying a split-screen comprising a first pane for displaying an added application identifier and a second pane for displaying a deleted application identifier.

2. The application software installation method of claim 1, wherein after sending the editing instruction, the application software installation method further comprises:

receiving an installation operation from the user for first application software of the updated to-be-installed application set; and installing the first application software.

3. The application software installation method of claim 2, further comprising:

determining second application software of the updated to-be-installed application set that has not been installed in the device; and installing the second application software.

4. The application software installation method of claim 2, further comprising:

determining third application software of the updated to-be-installed application set that has been installed in the device;

determining fourth application software of the third application software that is not a latest version; and upgrading the fourth application software to the latest version.

5. The application software installation method of claim 4, wherein before upgrading the fourth application software, the application software installation method further comprises:

receiving an upgrade operation from the user for the fourth application software; and upgrading the fourth application software to the latest version based on the upgrade operation.

6. The application software installation method of claim 1, wherein the editing operation comprises an application deletion operation or an application adding operation, wherein the editing instruction instructs to delete a third application software identifier from the to-be-installed application set when the editing operation is the application deletion operation, wherein the updated to-be-installed application set does not comprise the third application software identifier, or the editing instruction instructs to add a fourth application software identifier to the to-be-installed application set when the editing operation is the application adding operation, and wherein the updated to-be-installed application set comprises the fourth application software identifier.

7. The application software installation method of claim 6, wherein when the editing operation comprises the application deletion operation and after sending the editing instruction, the application software installation method further comprises:
  receiving a restoration operation from the user for the third application software identifier; and
  sending a restoration instruction for the third application software identifier based on the restoration operation, wherein the restoration instruction instructs to restore the third application software identifier in the updated to-be-installed application set such that the updated to-be-installed application set comprises the third application software identifier.

8. The application software installation method of claim 7, wherein before receiving the restoration operation from the user for the third application software identifier, the first pane displays the first application software identifier in the updated to-be-installed application set, and wherein the second pane displays the third application software identifier and a key for restoring the third application software identifier.

9. The application software installation method of claim 1, further comprising accessing a server by logging in to an associated account, wherein the associated account corresponds to the to-be-installed application set.

10. The application software installation method of claim 9, wherein after accessing the server by logging in to the associated account, the application software installation method further comprises sending an adding request for a third application software identifier to the server when the device comprises a first application software corresponding to the third application software identifier that does not belong to the to-be-installed application set, and wherein the adding request instructs the server to add the third application software identifier to the to-be-installed application set.

11. An application software installation method, implemented by a server, wherein the application software installation method comprises:
  accessing a device;
  causing the device to display an upgrade prompt, wherein the upgrade prompt comprises a confirmation key;
  receiving a confirmation key input from the device;
  backing up to-be-installed application software;
  receiving, from the device and based on the confirmation key input, an editing instruction for a to-be-installed application set, wherein the to-be-installed application set comprises a plurality of application software identifiers, and wherein the application software identifiers correspond to to-be-installed application software;
  obtaining an updated to-be-installed application set by either adding a first application software identifier to the to-be-installed application set or deleting a second application software identifier from the to-be-installed application set based on the editing instruction; and
  displaying a split-screen comprising a first pane for displaying an added application identifier and a second pane for displaying a deleted application identifier.

12. The application software installation method of claim 11, wherein the editing instruction corresponds to an editing operation comprising an application deletion operation or an application adding operation, wherein the application software installation method further comprises deleting a third application software identifier from the to-be-installed application set to obtain the updated to-be-installed application set based on the editing instruction when the editing operation is the application deletion operation, wherein the updated to-be-installed application set does not comprise the third application software identifier, or the application software installation method further comprises adding a fourth application software identifier to the to-be-installed application set to obtain the updated to-be-installed application set based on the editing instruction when the editing operation is the application adding operation, and wherein the updated to-be-installed application set comprises the fourth application software identifier.

13. The application software installation method of claim 12, wherein when the editing operation is the application deletion operation and after deleting the third application software identifier from the to-be-installed application set, the application software installation method further comprises:
  receiving a restoration instruction for the third application software identifier from the device; and
  restoring the third application software identifier based on the restoration instruction such that the updated to-be-installed application set comprises the third application software identifier.

14. The application software installation method of claim 11, further comprising accepting device access to the server using an associated account, wherein the associated account corresponds to the to-be-installed application set.

15. The application software installation method of claim 14, wherein after accepting the device access to the server, the application software installation method further comprises:
  receiving an adding request for a third application software identifier from the device when application software corresponding to the third application software identifier does not belong to the to-be-installed application set; and
  adding the third application software identifier to the to-be-installed application set based on the adding request.

16. An application software installation device, comprising:
  an interaction system configured to:
    display an upgrade prompt, wherein the upgrade prompt comprises a confirmation key;
    receive a confirmation key input;
    receive, based on the confirmation key input, an editing operation from a user for a to-be-installed application set, wherein the to-be-installed application set comprises a plurality of application software identifiers corresponding to to-be-installed application software from another device;
  a processor configured to generate an editing instruction for the to-be-installed application set based on the editing operation, wherein the editing instruction instructs to either add a first application software identifier to the to-be-installed application set or delete a second application software identifier from the to-be-installed application set;
  a communications port coupled to the interaction system and the processor, wherein the communications port is configured to send the editing instruction to an updated to-be-installed application set; and
  a split-screen display comprising a first pane for displaying an added application identifier and a second pane for displaying a deleted application identifier.

17. The application software installation device of claim 16, wherein after the communications port is configured to send the editing instruction for the to-be-installed application set, the interaction system is further configured to receive an installation operation from the user for first application software of the updated to-be-installed application set, and wherein the processor is further configured to install the first application software.

18. The application software installation device of claim 17, wherein the processor is further configured to:
   determine second application software of the updated to-be-installed application set that has not been installed in the device; and
   install the second application software.

19. The application software installation device of claim 17, wherein the processor is further configured to:
   determine a third application software of the updated to-be-installed application set that has been installed in the device;
   determine a fourth application software of the third application software that is not a-latest version; and
   upgrade the fourth application software to the latest version.

20. The application software installation device of claim 19, wherein before the processor is configured to upgrade the fourth application software, the interaction system is further configured to receive an upgrade operation from the user for the fourth application software, and wherein the processor is further configured to upgrade the fourth application software to the latest version based on the upgrade operation.

* * * * *

UNITED STATES PATENT AND TRADEMARK OFFICE
CERTIFICATE OF CORRECTION

| | | |
|---|---|---|
| PATENT NO. | : 11,775,274 B2 | Page 1 of 1 |
| APPLICATION NO. | : 17/059742 | |
| DATED | : October 3, 2023 | |
| INVENTOR(S) | : Wenbo Wei | |

It is certified that error appears in the above-identified patent and that said Letters Patent is hereby corrected as shown below:

In the Claims

Claim 19, Column 39, Line 15: "is not a-latest version;" should read "is not a latest version;"

Signed and Sealed this
Ninth Day of April, 2024

Katherine Kelly Vidal
*Director of the United States Patent and Trademark Office*